(12) United States Patent
Noda

(10) Patent No.: US 7,706,086 B2
(45) Date of Patent: Apr. 27, 2010

(54) IMAGING LENS

(75) Inventor: Takayuki Noda, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/936,686

(22) Filed: Nov. 7, 2007

(65) Prior Publication Data

US 2008/0137219 A1    Jun. 12, 2008

(30) Foreign Application Priority Data

Nov. 8, 2006   (JP)   ............. P2006-303104
Nov. 2, 2007   (JP)   ............. P2007-285913

(51) Int. Cl.
G02B 9/12   (2006.01)

(52) U.S. Cl. ................. 359/784; 359/785

(58) Field of Classification Search ......... 359/784–785, 359/789, 791, 754
See application file for complete search history.

(56) References Cited

U.S. PATENT DOCUMENTS

| | | | | |
|---|---|---|---|---|
| 6,490,102 | B1 * | 12/2002 | Huang | 359/785 |
| 6,930,841 | B2 * | 8/2005 | Sato | 359/784 |
| 6,961,191 | B2 * | 11/2005 | Sato | 359/785 |
| 6,970,306 | B2 * | 11/2005 | Matsuo | 359/716 |
| 7,099,092 | B2 * | 8/2006 | Sato | 359/791 |
| 2004/0190162 | A1 * | 9/2004 | Sato | 359/784 |
| 2004/0212901 | A1 * | 10/2004 | Nanba et al. | 359/785 |

FOREIGN PATENT DOCUMENTS

| JP | 2003-322792 | A | 11/2003 |
|---|---|---|---|
| JP | 2004-4566 | A | 1/2004 |
| JP | 2004-226487 | A | 8/2004 |
| JP | 2004-240063 | A | 8/2004 |
| JP | 2005-17440 | A | 1/2005 |
| JP | 2005-292235 | A | 10/2005 |
| JP | 2005-345919 | A | 12/2005 |
| JP | 2005-352317 | A | 12/2005 |
| JP | 2006-47858 | A | 2/2006 |
| JP | 2006-084720 | | 3/2006 |

* cited by examiner

*Primary Examiner*—Joseph Martinez
*Assistant Examiner*—James R Greece
(74) *Attorney, Agent, or Firm*—Birch, Stewart, Kolasch & Birch, LLP

(57) ABSTRACT

An imaging lens includes: in order from an object side, an aperture diaphragm; a first lens of a positive lens having a convex surface on the object side; a second lens of a meniscus lens having a concave surface on the object side; and a third lens. The imaging lens satisfies: f/f3<0.95 and BR2<0. BR2 satisfies BR2=A/D4, A represents a distance from a vertex position on a object-side surface of the second lens and on an optical axis to a position on a image-side surface of the second lens through which a light ray passes toward a corner of an image height, provided that a traveling direction of the light ray is taken as appositive direction, and D4 represents a center thickness of the second lens. f represents a focal length of the imaging lens. f3 represents a focal length of the third lens.

15 Claims, 33 Drawing Sheets

EXAMPLE 1

EXAMPLE 11

EXAMPLE 12

EXAMPLE 13

FIG. 15A

AD: APERTURE DIAPHRAGM

| | EXAMPLE 1: BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | $\nu$dj (ABBE NUMBER) |
| | 1 (AD) | — | 0.00 | | |
| L1 | 2 | 1.766 | 0.88 | 1.51002 | 56.2 |
| L1 | 3 | 19.320 | 1.00 | | |
| L2 | 4 | -1.221 | 0.62 | 1.60900 | 27.0 |
| L2 | 5 | -1.272 | 0.19 | | |
| L3 | 6 | 4.333 | 1.06 | 1.51003 | 56.2 |
| L3 | 7 | 1.897 | 0.31 | | |
| GC | 8 | ∞ | 0.70 | 1.51680 | 64.2 |
| GC | 9 | ∞ | 0.46 | | |

FIG. 15B

| | EXAMPLE 1: ASPHERICAL DATA | | | | |
|---|---|---|---|---|---|
| SURFACE NUMBER | COEFFICIENT | | | | |
| 2 | KA | $B_4$ | $B_6$ | $B_8$ | $B_{10}$ |
| 2 | 1.00000E+00 | 1.33395E-03 | -1.66453E-02 | -1.13951E-02 | 8.66571E-03 |
| 3 | KA | $B_4$ | $B_6$ | $B_8$ | $B_{10}$ |
| 3 | 1.00000E+00 | -1.63712E-02 | -4.41156E-02 | 4.90217E-02 | -3.89466E-02 |
| 4 | KA | $B_4$ | $B_6$ | $B_8$ | $B_{10}$ |
| 4 | 5.00000E-01 | -1.60522E-01 | 2.66217E-01 | -1.56548E-01 | 3.02419E-02 |
| 5 | KA | $B_4$ | $B_6$ | $B_8$ | $B_{10}$ |
| 5 | -5.00000E-01 | -1.11880E-01 | 9.78084E-02 | 3.12783E-03 | -3.62280E-03 |
| 6 | KA | $B_4$ | $B_6$ | $B_8$ | $B_{10}$ |
| 6 | 1.00000E+00 | -8.75790E-02 | 3.02220E-02 | -4.75950E-03 | 2.80286E-04 |
| 7 | KA | $B_4$ | $B_6$ | $B_8$ | $B_{10}$ |
| 7 | 0.00000E+00 | -9.15440E-02 | 1.04700E-02 | -2.99873E-04 | -3.95801E-05 |

FIG. 16A

EXAMPLE 2: BASIC LENS DATA  (AD: APERTURE DIAPHRAGM)

| | Si (SURFACE NUMBER) | Ri (RADIUS OF CURVATURE) | Di (SURFACE SPACING) | Ndj (REFRACTIVE INDEX) | $\nu dj$ (ABBE NUMBER) |
|---|---|---|---|---|---|
| | 1 (AD) | — | 0.00 | | |
| L1 | 2 | 1.988 | 0.88 | 1.51004 | 57.8 |
| | 3 | 7.478 | 1.43 | | |
| L2 | 4 | −1.761 | 0.94 | 1.53246 | 55.3 |
| | 5 | −1.020 | 0.10 | | |
| L3 | 6 | −4.912 | 1.00 | 1.51112 | 57.6 |
| | 7 | 2.098 | 0.88 | | |
| GC | 8 | ∞ | 0.46 | 1.51680 | 64.2 |
| | 9 | ∞ | 0.77 | | |

FIG. 16B

EXAMPLE 2: ASPHERICAL DATA

| SURFACE NUMBER | COEFFICIENT | | | | |
|---|---|---|---|---|---|
| 2 | KA  1.00000E+00 | $B_3$  1.36669E−03 | $B_4$ −1.07051E−02 | $B_5$  2.60408E−02 | $B_6$ −1.77607E−02 |
| | | $B_7$ −1.04211E−02 | $B_8$  1.17142E−02 | $B_9$  7.17215E−05 | $B_{10}$  1.53134E−03 |
| 3 | KA  1.00000E+00 | $B_3$  4.76371E−03 | $B_4$ −9.90669E−03 | $B_5$  1.22074E−02 | $B_6$ −1.09433E−02 |
| | | $B_7$  1.51798E−03 | $B_8$  1.57368E−02 | $B_9$  9.30214E−04 | $B_{10}$ −1.44106E−02 |
| 4 | KA  2.23266E−01 | $B_3$ −1.28898E−02 | $B_4$ −6.44181E−02 | $B_5$ −3.77481E−02 | $B_6$  4.85490E−02 |
| | | $B_7$  2.74338E−03 | $B_8$ −9.38529E−03 | $B_9$ −1.91122E−03 | $B_{10}$ −7.00815E−04 |
| 5 | KA −2.42866E+00 | $B_3$ −5.27595E−02 | $B_4$ −6.71811E−02 | $B_5$ −1.27782E−03 | $B_6$  2.78786E−02 |
| | | $B_7$  4.99925E−03 | $B_8$ −1.98443E−03 | $B_9$  5.88049E−04 | $B_{10}$ −2.60909E−04 |
| 6 | KA −6.47300E+01 | $B_3$ −2.14703E−02 | $B_4$ −5.90187E−03 | $B_5$  1.29062E−02 | $B_6$ −1.43579E−03 |
| | | $B_7$ −5.06190E−04 | $B_8$ −3.15482E−04 | $B_9$  1.61567E−05 | $B_{10}$  3.53989E−05 |
| 7 | KA −1.06307E+01 | $B_3$ −3.09190E−02 | $B_4$ −7.34160E−03 | $B_5$  9.69897E−04 | $B_6$  2.05882E−04 |
| | | $B_7$ −3.61583E−04 | $B_8$  2.50289E−04 | $B_9$ −1.66127E−05 | $B_{10}$ −1.46179E−05 |

FIG. 17A

AD: APERTURE DIAPHRAGM

| | EXAMPLE 3: BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | νdj (ABBE NUMBER) |
| | 1 (AD) | — | 0.00 | | |
| L1 | 2 | 1.702 | 1.04 | 1.50000 | 57.5 |
| L1 | 3 | ∞ | 0.67 | | |
| L2 | 4 | -1.034 | 0.58 | 1.60398 | 27.2 |
| L2 | 5 | -1.374 | 0.13 | | |
| L3 | 6 | 3.070 | 0.90 | 1.52000 | 54.5 |
| L3 | 7 | 2.722 | 1.00 | | |
| GC | 8 | ∞ | 0.70 | 1.51633 | 64.1 |
| GC | 9 | ∞ | 0.21 | | |

FIG. 17B

| EXAMPLE 3: ASPHERICAL DATA | | | | | |
|---|---|---|---|---|---|
| SURFACE NUMBER | COEFFICIENT | | | | |
| 2 | KA 1.00000E+00 | $B_3$ -9.44588E-04 | $B_4$ -2.11258E-03 | $B_5$ -1.49096E-02 | $B_6$ 2.34073E-02 |
| | | $B_7$ 6.70112E-03 | $B_8$ -6.29354E-02 | $B_9$ 5.47185E-03 | $B_{10}$ 1.47462E-02 |
| 3 | KA 1.00000E+00 | $B_3$ -5.34007E-03 | $B_4$ 2.76065E-02 | $B_5$ -1.18583E-01 | $B_6$ -3.47428E-02 |
| | | $B_7$ 1.49720E-01 | $B_8$ 1.14065E-01 | $B_9$ -5.42239E-01 | $B_{10}$ 2.88243E-01 |
| 4 | KA 1.00000E+00 | $B_3$ 1.29593E-01 | $B_4$ -6.38755E-02 | $B_5$ 8.76953E-02 | $B_6$ 2.13232E-01 |
| | | $B_7$ 1.14827E-01 | $B_8$ -2.19168E-01 | $B_9$ -4.39772E-01 | $B_{10}$ 3.78161E-01 |
| 5 | KA 1.00000E+00 | $B_3$ 1.46534E-01 | $B_4$ -1.04622E-01 | $B_5$ 1.11813E-01 | $B_6$ 1.08312E-01 |
| | | $B_7$ -2.59190E-02 | $B_8$ -5.99542E-02 | $B_9$ -7.53878E-03 | $B_{10}$ 3.26219E-02 |
| 6 | KA 1.00000E+00 | $B_3$ 6.10804E-02 | $B_4$ -1.56735E-01 | $B_5$ 2.22536E-02 | $B_6$ 3.02656E-02 |
| | | $B_7$ -4.97171E-03 | $B_8$ -1.02774E-02 | $B_9$ -1.15918E-03 | $B_{10}$ 2.50725E-03 |
| 7 | KA 1.00000E+00 | $B_3$ 3.25561E-02 | $B_4$ -1.80229E-01 | $B_5$ 7.56787E-02 | $B_6$ 9.19129E-03 |
| | | $B_7$ -1.90192E-02 | $B_8$ -3.31433E-03 | $B_9$ 6.47277E-03 | $B_{10}$ -1.65154E-03 |

FIG. 18A

AD: APERTURE DIAPHRAGM

| | EXAMPLE 4: BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | $\nu dj$ (ABBE NUMBER) |
| | 1 (AD) | — | 0.00 | | |
| L1 | 2 | 1.119 | 0.63 | 1.51005 | 55.9 |
| | 3 | 4.752 | 0.84 | | |
| L2 | 4 | -1.154 | 0.40 | 1.60595 | 26.9 |
| | 5 | -2.493 | 0.06 | | |
| L3 | 6 | 1.438 | 0.70 | 1.51005 | 55.9 |
| | 7 | 2.754 | 0.27 | | |
| GC | 8 | ∞ | 0.25 | 1.51633 | 64.1 |
| | 9 | ∞ | 0.41 | | |

FIG. 18B

| EXAMPLE 4: ASPHERICAL DATA | | | | | |
|---|---|---|---|---|---|
| SURFACE NUMBER | COEFFICIENT | | | | |
| 2 | KA -1.17195E-01 | $B_3$ -6.95761E-04 | $B_4$ 6.90105E-02 | $B_5$ 9.51676E-02 | $B_6$ -1.15692E-01 |
| | | $B_7$ -1.59653E-01 | $B_8$ 1.11961E-01 | $B_9$ 1.26083E+00 | $B_{10}$ -1.61122E+00 |
| 3 | KA 0.00000E+00 | $B_3$ 3.15305E-02 | $B_4$ -2.34666E-01 | $B_5$ 7.54272E-01 | $B_6$ -1.32164E+00 |
| | | $B_7$ -1.41950E-01 | $B_8$ 1.96543E+00 | $B_9$ -2.41005E-01 | $B_{10}$ -1.92435E+00 |
| 4 | KA 0.00000E+00 | $B_3$ 0.00000E+00 | $B_4$ -8.37293E+00 | $B_5$ 4.90349E+01 | $B_6$ -1.16304E+02 |
| | | $B_7$ 5.39257E+01 | $B_8$ 2.41553E+02 | $B_9$ -4.25915E+02 | $B_{10}$ 2.11247E+02 |
| 5 | KA -1.00000E+00 | $B_3$ 0.00000E+00 | $B_4$ -1.67722E+01 | $B_5$ 1.09234E+02 | $B_6$ -3.54761E+02 |
| | | $B_7$ 6.61039E+02 | $B_8$ -7.14838E-02 | $B_9$ 4.15881E+02 | $B_{10}$ -1.00114E+02 |
| 6 | KA 0.00000E+00 | $B_3$ -4.78278E-01 | $B_4$ -1.76230E-01 | $B_5$ 2.91336E-01 | $B_6$ 1.11224E-01 |
| | | $B_7$ -7.00503E-02 | $B_8$ -5.94370E-02 | $B_9$ 1.34162E-02 | $B_{10}$ 6.76463E-03 |
| 7 | KA -8.70219E-01 | $B_3$ 8.30607E-01 | $B_4$ -1.82616E+00 | $B_5$ 1.16295E+00 | $B_6$ -2.13747E-02 |
| | | $B_7$ -2.49212E-01 | $B_8$ -7.39655E-03 | $B_9$ 8.82767E-02 | $B_{10}$ -2.60562E-02 |

FIG. 19A

EXAMPLE 5: BASIC LENS DATA — AD: APERTURE DIAPHRAGM

| | Si (SURFACE NUMBER) | Ri (RADIUS OF CURVATURE) | Di (SURFACE SPACING) | Ndj (REFRACTIVE INDEX) | $\nu dj$ (ABBE NUMBER) |
|---|---|---|---|---|---|
| | 1 (AD) | — | 0.00 | | |
| L1 | 2 | 1.436 | 0.70 | 1.51004 | 57.8 |
| | 3 | 4.158 | 1.14 | | |
| L2 | 4 | -1.417 | 0.66 | 1.53245 | 55.3 |
| | 5 | -0.791 | 0.08 | | |
| L3 | 6 | -2.461 | 0.70 | 1.51112 | 57.6 |
| | 7 | 1.984 | 0.70 | | |
| GC | 8 | ∞ | 0.35 | 1.51680 | 64.2 |
| | 9 | ∞ | 0.76 | | |

FIG. 19B

EXAMPLE 5: ASPHERICAL DATA

| SURFACE NUMBER | COEFFICIENT | | | | |
|---|---|---|---|---|---|
| 2 | $KA$ 1.00000E+00 | $B_3$ 5.80521E-04 | $B_4$ -1.79100E-02 | $B_5$ 6.53777E-02 | $B_6$ -5.50677E-02 |
| | | $B_7$ -4.08499E-02 | $B_8$ 5.32123E-02 | $B_9$ -1.14715E-03 | $B_{10}$ 1.84025E-02 |
| 3 | $KA$ 1.00000E+00 | $B_3$ 3.06704E-03 | $B_4$ -9.70787E-03 | $B_5$ 4.39941E-02 | $B_6$ -3.49563E-02 |
| | | $B_7$ -2.13987E-02 | $B_8$ 4.05712E-02 | $B_9$ 1.22246E-02 | $B_{10}$ -1.17689E-02 |
| 4 | $KA$ 3.20699E-01 | $B_3$ -6.72723E-02 | $B_4$ -1.29599E-01 | $B_5$ -1.11450E-01 | $B_6$ 1.34723E-01 |
| | | $B_7$ 1.81006E-03 | $B_8$ -5.52099E-02 | $B_9$ -2.95758E-02 | $B_{10}$ -2.74448E-02 |
| 5 | $KA$ -1.53816E+00 | $B_3$ -2.61955E-02 | $B_4$ -1.61316E-01 | $B_5$ -1.27262E-02 | $B_6$ 8.55823E-02 |
| | | $B_7$ 2.30744E-02 | $B_8$ -6.20035E-03 | $B_9$ 5.24572E-03 | $B_{10}$ -8.73856E-04 |
| 6 | $KA$ -4.32803E+00 | $B_3$ 1.85323E-03 | $B_4$ 4.31496E-03 | $B_5$ 2.55859E-02 | $B_6$ -7.83195E-03 |
| | | $B_7$ -1.77114E-03 | $B_8$ -2.14829E-03 | $B_9$ 7.33054E-04 | $B_{10}$ 2.40891E-04 |
| 7 | $KA$ -7.10485E-01 | $B_3$ -1.68786E-01 | $B_4$ -2.05371E-02 | $B_5$ 1.71012E-02 | $B_6$ 1.13179E-02 |
| | | $B_7$ -8.16742E-03 | $B_8$ 1.26170E-03 | $B_9$ 3.08305E-04 | $B_{10}$ -1.98925E-04 |

FIG. 20A

AD: APERTURE DIAPHRAGM

| | Si (SURFACE NUMBER) | Ri (RADIUS OF CURVATURE) | Di (SURFACE SPACING) | Ndj (REFRACTIVE INDEX) | $\nu dj$ (ABBE NUMBER) |
|---|---|---|---|---|---|
| | 1 (AD) | — | 0.00 | | |
| L1 | 2 | 1.151 | 0.60 | 1.51007 | 56.2 |
| | 3 | 2.800 | 0.96 | | |
| L2 | 4 | -0.835 | 0.30 | 1.60595 | 28.0 |
| | 5 | -1.180 | 0.06 | | |
| L3 | 6 | 1.429 | 0.40 | 1.51007 | 56.2 |
| | 7 | 100.000 | 0.00 | | |
| GC | 8 | ∞ | 0.25 | 1.51633 | 64.1 |
| | 9 | ∞ | 1.00 | | |

FIG. 20B

EXAMPLE 6: ASPHERICAL DATA

| SURFACE NUMBER | COEFFICIENT | | | | |
|---|---|---|---|---|---|
| 2 | KA | $B_3$ | $B_4$ | $B_5$ | $B_6$ |
| | -1.17195E-01 | 6.65451E-03 | 8.22177E-02 | 1.11326E-01 | -1.65854E-01 |
| | | $B_7$ | $B_8$ | $B_9$ | $B_{10}$ |
| | | -1.49149E-01 | -1.05813E-01 | 1.19997E+00 | -7.67647E-01 |
| 3 | KA | $B_3$ | $B_4$ | $B_5$ | $B_6$ |
| | 0.00000E+00 | -8.24899E-03 | -8.42825E-02 | 8.07552E-01 | -1.49620E+00 |
| | | $B_7$ | $B_8$ | $B_9$ | $B_{10}$ |
| | | -2.12446E-01 | 2.04526E+00 | 2.39134E-01 | -2.02168E+00 |
| 4 | KA | $B_3$ | $B_4$ | $B_5$ | $B_6$ |
| | 1.00403E+00 | 4.86875E-01 | -8.96112E+00 | 4.89006E+01 | -1.16433E+02 |
| | | $B_7$ | $B_8$ | $B_9$ | $B_{10}$ |
| | | 5.42983E+01 | 2.44032E+02 | -4.24994E+02 | 2.09375E+02 |
| 5 | KA | $B_3$ | $B_4$ | $B_5$ | $B_6$ |
| | 1.04537E+00 | 5.61120E-02 | -1.67387E+01 | 1.09045E+02 | -3.54940E+02 |
| | | $B_7$ | $B_8$ | $B_9$ | $B_{10}$ |
| | | 6.61058E+02 | -7.14822E+02 | 4.16144E+02 | -9.97171E+01 |
| 6 | KA | $B_3$ | $B_4$ | $B_5$ | $B_6$ |
| | 3.78953E-01 | -4.56368E-01 | -1.97650E-01 | 2.98643E-01 | 1.09342E-01 |
| | | $B_7$ | $B_8$ | $B_9$ | $B_{10}$ |
| | | -7.25510E-02 | -5.98661E-02 | 1.26050E-02 | 6.95997E-03 |
| 7 | KA | $B_3$ | $B_4$ | $B_5$ | $B_6$ |
| | -1.51256E+00 | 3.10976E+00 | -1.26830E+01 | 2.78999E+01 | -3.91284E+01 |
| | | $B_7$ | $B_8$ | $B_9$ | $B_{10}$ |
| | | 3.47033E+01 | -1.87125E+01 | 5.60679E+00 | -7.19679E-01 |

FIG. 21A

AD: APERTURE DIAPHRAGM

| | EXAMPLE 7: BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | $\nu dj$ (ABBE NUMBER) |
| | 1 (AD) | — | 0.00 | | |
| L1 | 2 | 2.263 | 0.70 | 1.51000 | 57.7 |
| | 3 | 9.244 | 1.85 | | |
| L2 | 4 | -2.119 | 0.73 | 1.51000 | 42.0 |
| | 5 | -1.288 | 0.20 | | |
| L3 | 6 | -10.940 | 0.80 | 1.53480 | 54.5 |
| | 7 | 3.468 | 0.88 | | |
| GC | 8 | ∞ | 0.46 | 1.51680 | 64.2 |
| | 9 | ∞ | 0.97 | | |

FIG. 21B

| | EXAMPLE 7: ASPHERICAL DATA | | | | |
|---|---|---|---|---|---|
| SURFACE NUMBER | COEFFICIENT | | | | |
| 2 | KA 1.00000E+00 | $B_3$ -4.29208E-03 | $B_4$ 4.79963E-03 | $B_5$ 1.58117E-02 | $B_6$ -2.48996E-02 |
| | | $B_7$ -4.85138E-02 | $B_8$ 2.29450E-02 | $B_9$ 1.23290E-01 | $B_{10}$ -1.00778E-01 |
| 3 | KA 1.00000E+00 | $B_3$ 5.18073E-03 | $B_4$ -3.73154E-03 | $B_5$ -2.01160E-03 | $B_6$ -3.13250E-02 |
| | | $B_7$ 5.86052E-03 | $B_8$ 3.23952E-02 | $B_9$ 1.66410E-02 | $B_{10}$ -3.54780E-02 |
| 4 | KA 9.74470E-03 | $B_3$ -2.47074E-02 | $B_4$ -7.17332E-02 | $B_5$ -4.64837E-02 | $B_6$ 3.36671E-02 |
| | | $B_7$ 1.19365E-02 | $B_8$ 2.37483E-05 | $B_9$ -1.53783E-04 | $B_{10}$ -4.51759E-03 |
| 5 | KA -3.28361E+00 | $B_3$ -6.22502E-02 | $B_4$ -8.63086E-02 | $B_5$ -4.45945E-03 | $B_6$ 2.86205E-02 |
| | | $B_7$ 6.46416E-03 | $B_8$ -2.50513E-03 | $B_9$ 9.66838E-04 | $B_{10}$ -4.73880E-04 |
| 6 | KA -5.67078E+01 | $B_3$ 2.06226E-03 | $B_4$ -3.59300E-03 | $B_5$ 5.48991E-03 | $B_6$ -7.51900E-04 |
| | | $B_7$ -1.89366E-04 | $B_8$ -8.46159E-05 | $B_9$ 5.81559E-06 | $B_{10}$ 6.68744E-06 |
| 7 | KA -1.11107E+01 | $B_3$ -4.15575E-03 | $B_4$ -1.67746E-02 | $B_5$ 1.54448E-03 | $B_6$ 9.79303E-04 |
| | | $B_7$ -9.54423E-05 | $B_8$ 4.73326E-05 | $B_9$ -1.49672E-05 | $B_{10}$ -4.69667E-06 |

FIG. 22A

AD: APERTURE DIAPHRAGM

EXAMPLE 8: BASIC LENS DATA

| Si (SURFACE NUMBER) | Ri (RADIUS OF CURVATURE) | Di (SURFACE SPACING) | Ndj (REFRACTIVE INDEX) | $\nu dj$ (ABBE NUMBER) |
|---|---|---|---|---|
| 1 (AD) | — | 0.00 | | |
| 2 | 2.204 | 0.70 | 1.53999 | 53.9 |
| 3 | 10.347 | 1.50 | | |
| 4 | −1.113 | 0.75 | 1.54001 | 43.6 |
| 5 | −0.997 | 0.20 | | |
| 6 | 14.230 | 0.89 | 1.54000 | 53.9 |
| 7 | 2.164 | 0.88 | | |
| 8 | ∞ | 0.46 | 1.51680 | 64.2 |
| 9 | ∞ | 1.25 | | |

L1: surfaces 2, 3
L2: surfaces 4, 5
L3: surfaces 6, 7
GC: surfaces 8, 9

FIG. 22B

EXAMPLE 8: ASPHERICAL DATA

| SURFACE NUMBER | COEFFICIENT | | | | |
|---|---|---|---|---|---|
| 2 | KA 1.00000E+00 | $B_3$ −1.35561E−02 | $B_4$ 2.27111E−02 | $B_5$ 1.86614E−02 | $B_6$ −3.90686E−02 |
| | | $B_7$ −6.25531E−02 | $B_8$ 1.86402E−02 | $B_9$ 1.29660E−01 | $B_{10}$ −8.28290E−02 |
| 3 | KA 1.00000E+00 | $B_3$ 7.45137E−03 | $B_4$ −1.10115E−02 | $B_5$ 4.96398E−03 | $B_6$ −3.24722E−02 |
| | | $B_7$ −2.95561E−03 | $B_8$ 2.62085E−02 | $B_9$ 1.96320E−02 | $B_{10}$ −2.40024E−02 |
| 4 | KA 0.00000E+00 | $B_3$ 5.39031E−03 | $B_4$ −3.30334E−02 | $B_5$ −2.59672E−02 | $B_6$ 4.31770E−02 |
| | | $B_7$ 1.49828E−02 | $B_8$ −1.59250E−03 | $B_9$ −2.69800E−03 | $B_{10}$ −2.30208E−03 |
| 5 | KA −2.29329E+00 | $B_3$ −5.28820E−02 | $B_4$ −8.48969E−02 | $B_5$ 7.62171E−03 | $B_6$ 3.71457E−02 |
| | | $B_7$ 1.12165E−02 | $B_8$ −1.71978E−03 | $B_9$ 2.83205E−04 | $B_{10}$ −1.42065E−03 |
| 6 | KA 0.00000E+00 | $B_3$ −1.32361E−02 | $B_4$ −8.20270E−03 | $B_5$ 4.50696E−03 | $B_6$ −7.82369E−04 |
| | | $B_7$ −5.60227E−05 | $B_8$ −2.78873E−05 | $B_9$ 1.90007E−05 | $B_{10}$ 1.83612E−06 |
| 7 | KA −1.24223E+01 | $B_3$ −3.37618E−02 | $B_4$ −1.62197E−02 | $B_5$ 7.48359E−03 | $B_6$ −1.53521E−04 |
| | | $B_7$ −4.06347E−04 | $B_8$ 2.73334E−05 | $B_9$ 1.54358E−06 | $B_{10}$ −4.04221E−06 |

FIG. 23A

EXAMPLE 9: BASIC LENS DATA    AD: APERTURE DIAPHRAGM

| | Si (SURFACE NUMBER) | Ri (RADIUS OF CURVATURE) | Di (SURFACE SPACING) | Ndj (REFRACTIVE INDEX) | $\nu dj$ (ABBE NUMBER) |
|---|---|---|---|---|---|
| | 1 (AD) | — | 0.00 | | |
| L1 | 2 | 1.538 | 0.85 | 1.51002 | 56.2 |
| | 3 | -27.284 | 0.92 | | |
| L2 | 4 | -0.971 | 0.47 | 1.60596 | 26.9 |
| | 5 | -1.011 | 0.29 | | |
| L3 | 6 | 6.614 | 0.55 | 1.51003 | 56.2 |
| | 7 | 1.568 | 0.50 | | |
| GC | 8 | ∞ | 0.25 | 1.51680 | 64.2 |
| | 9 | ∞ | 0.26 | | |

FIG. 23B

EXAMPLE 9: ASPHERICAL DATA

| SURFACE NUMBER | COEFFICIENT | | | | |
|---|---|---|---|---|---|
| | KA | $B_4$ | $B_6$ | $B_8$ | $B_{10}$ |
| 2 | 1.00000E+00 | -2.84923E-02 | -2.07758E-02 | -5.84920E-02 | -6.11845E-02 |
| | KA | $B_4$ | $B_6$ | $B_8$ | $B_{10}$ |
| 3 | 1.00000E+00 | -7.87712E-02 | -1.64336E-01 | 1.29015E-01 | -1.82316E-01 |
| | KA | $B_4$ | $B_6$ | $B_8$ | $B_{10}$ |
| 4 | 5.00000E-01 | -4.76057E-01 | 7.72598E-01 | -9.91246E-01 | 3.84439E-01 |
| | KA | $B_4$ | $B_6$ | $B_8$ | $B_{10}$ |
| 5 | -5.00000E-01 | -2.40147E-01 | 2.67437E-01 | 1.48351E-02 | -2.40643E-02 |
| | KA | $B_4$ | $B_6$ | $B_8$ | $B_{10}$ |
| 6 | 1.00000E+00 | -1.56017E-01 | 9.44606E-02 | -2.42091E-02 | 2.32153E-03 |
| | KA | $B_4$ | $B_6$ | $B_8$ | $B_{10}$ |
| 7 | 0.00000E+00 | -1.80283E-01 | 3.68816E-02 | -2.88970E-03 | -1.29681E-04 |

FIG. 24A

AD: APERTURE DIAPHRAGM

EXAMPLE 10: BASIC LENS DATA

| Si (SURFACE NUMBER) | Ri (RADIUS OF CURVATURE) | Di (SURFACE SPACING) | Ndj (REFRACTIVE INDEX) | $\nu dj$ (ABBE NUMBER) |
|---|---|---|---|---|
| 1 (AD) | — | 0.00 | | |
| 2 | 1.569 | 1.58 | 1.53156 | 55.1 |
| 3 | ∞ | 0.52 | | |
| 4 | -1.263 | 0.52 | 1.60398 | 27.2 |
| 5 | -2.116 | 0.42 | | |
| 6 | 5.980 | 0.69 | 1.53156 | 55.1 |
| 7 | 2.469 | 0.50 | | |
| 8 | ∞ | 0.15 | 1.51633 | 64.1 |
| 9 | ∞ | 0.37 | | |

L1: surfaces 2,3
L2: surfaces 4,5
L3: surfaces 6,7
GC: surfaces 8,9

FIG. 24B

EXAMPLE 10: ASPHERICAL DATA

| SURFACE NUMBER | COEFFICIENT | | | | |
|---|---|---|---|---|---|
| 2 | KA 1.00000E+00 | $B_3$ -8.02798E-03 | $B_4$ 1.58161E-02 | $B_5$ -7.16842E-03 | $B_6$ -3.58308E-02 |
| | | $B_7$ 1.64488E-03 | $B_8$ 2.39393E-02 | $B_9$ 3.29827E-04 | $B_{10}$ 4.32793E-04 |
| 3 | KA 1.00000E+00 | $B_3$ -2.33498E-02 | $B_4$ 7.60434E-02 | $B_5$ -1.45546E-01 | $B_6$ -9.69135E-02 |
| | | $B_7$ 7.45717E-02 | $B_8$ 2.71133E-02 | $B_9$ -1.75031E-03 | $B_{10}$ -2.11596E-03 |
| 4 | KA 1.00000E+00 | $B_3$ 9.83898E-02 | $B_4$ -1.38905E-01 | $B_5$ -1.25077E-02 | $B_6$ 1.12886E-01 |
| | | $B_7$ 4.56258E-02 | $B_8$ -2.28446E-01 | $B_9$ 1.95046E-04 | $B_{10}$ 2.99734E-04 |
| 5 | KA 1.00000E+00 | $B_3$ 1.04073E-01 | $B_4$ -1.36481E-01 | $B_5$ 1.09051E-01 | $B_6$ 1.26564E-01 |
| | | $B_7$ -7.60266E-03 | $B_8$ -5.08015E-02 | $B_9$ -1.58328E-04 | $B_{10}$ -3.07904E-04 |
| 6 | KA 1.00000E+00 | $B_3$ -3.40106E-03 | $B_4$ -1.59360E-01 | $B_5$ 4.70918E-02 | $B_6$ 4.57724E-02 |
| | | $B_7$ 3.84597E-04 | $B_8$ -9.83663E-03 | $B_9$ -1.83717E-03 | $B_{10}$ 1.10061E-03 |
| 7 | KA 1.00000E+00 | $B_3$ 4.66474E-02 | $B_4$ -2.22703E-01 | $B_5$ 9.00451E-02 | $B_6$ 1.49040E-02 |
| | | $B_7$ -1.75735E-02 | $B_8$ -2.95073E-03 | $B_9$ 5.81423E-03 | $B_{10}$ -1.59609E-03 |

FIG. 25A

AD: APERTURE DIAPHRAGM

| | Si (SURFACE NUMBER) | Ri (RADIUS OF CURVATURE) | Di (SURFACE SPACING) | Ndj (REFRACTIVE INDEX) | $\nu dj$ (ABBE NUMBER) |
|---|---|---|---|---|---|
| | \multicolumn{5}{c}{EXAMPLE 11: BASIC LENS DATA} |
| | 1 (AD) | — | 0.00 | | |
| L1 | 2 | 1.383 | 1.06 | 1.53156 | 55.1 |
| | 3 | ∞ | 0.47 | | |
| L2 | 4 | −1.108 | 0.58 | 1.60398 | 27.2 |
| | 5 | −1.489 | 0.81 | | |
| L3 | 6 | −4.566 | 0.69 | 1.53156 | 55.1 |
| | 7 | 2.484 | 0.30 | | |
| GC | 8 | ∞ | 0.40 | 1.51633 | 64.1 |
| | 9 | ∞ | 0.16 | | |

FIG. 25B

EXAMPLE 11: ASPHERICAL DATA

| SURFACE NUMBER | COEFFICIENT | | | | |
|---|---|---|---|---|---|
| 2 | KA 1.00000E+00 | $B_3$ 1.62277E−03 | $B_4$ −1.16693E−02 | $B_5$ −2.37881E−02 | $B_6$ 2.04636E−02 |
| | | $B_7$ 1.31537E−02 | $B_8$ −4.57875E−02 | $B_9$ 1.03638E−02 | $B_{10}$ 1.05616E−02 |
| 3 | KA 1.00000E+00 | $B_3$ −1.82007E−02 | $B_4$ 3.26406E−02 | $B_5$ −1.27683E−01 | $B_6$ −7.67128E−02 |
| | | $B_7$ 7.91112E−02 | $B_8$ 3.09783E−02 | $B_9$ −7.92203E−02 | $B_{10}$ 1.23773E−02 |
| 4 | KA 1.00000E+00 | $B_3$ 1.04484E−01 | $B_4$ −1.03775E−01 | $B_5$ 4.99124E−02 | $B_6$ 1.48130E−01 |
| | | $B_7$ 3.88329E−02 | $B_8$ −2.63710E−01 | $B_9$ 2.71112E−03 | $B_{10}$ 4.24286E−03 |
| 5 | KA 1.00000E+00 | $B_3$ 1.09916E−01 | $B_4$ −4.50957E−02 | $B_5$ 1.31417E−01 | $B_6$ 1.32006E−01 |
| | | $B_7$ −3.10402E−04 | $B_8$ −4.47602E−02 | $B_9$ −3.21490E−03 | $B_{10}$ 5.80428E−03 |
| 6 | KA 1.00000E+00 | $B_3$ −2.06225E−02 | $B_4$ −9.57841E−02 | $B_5$ 5.73645E−02 | $B_6$ 3.89985E−02 |
| | | $B_7$ −5.69907E−03 | $B_8$ −1.21759E−02 | $B_9$ −1.98602E−03 | $B_{10}$ 2.35450E−03 |
| 7 | KA 1.00000E+00 | $B_3$ −6.57960E−02 | $B_4$ −1.52542E−01 | $B_5$ 8.51457E−02 | $B_6$ 1.24665E−02 |
| | | $B_7$ −1.83447E−02 | $B_8$ −3.41768E−03 | $B_9$ 6.28568E−03 | $B_{10}$ −1.71540E−03 |

FIG. 26A

AD: APERTURE DIAPHRAGM

| | EXAMPLE 12: BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | νdj (ABBE NUMBER) |
| | 1 (AD) | — | 0.00 | | |
| L1 | 2 | 1.480 | 1.01 | 1.53156 | 55.1 |
| | 3 | ∞ | 0.68 | | |
| L2 | 4 | −1.361 | 0.58 | 1.60398 | 27.2 |
| | 5 | −1.730 | 0.69 | | |
| L3 | 6 | −2.168 | 0.93 | 1.53156 | 55.1 |
| | 7 | 2.780 | 0.30 | | |
| GC | 8 | ∞ | 0.40 | 1.51633 | 64.1 |
| | 9 | ∞ | 0.08 | | |

FIG. 26B

| EXAMPLE 12: ASPHERICAL DATA | | | | | |
|---|---|---|---|---|---|
| SURFACE NUMBER | COEFFICIENT | | | | |
| 2 | KA 1.00000E+00 | $B_3$ −6.62840E−03 | $B_4$ 6.75210E−03 | $B_5$ −3.12594E−02 | $B_6$ −4.89750E−03 |
| | | $B_7$ −4.48139E−04 | $B_8$ −1.07253E−02 | $B_9$ −5.10627E−05 | $B_{10}$ −1.55935E−04 |
| 3 | KA 1.00000E+00 | $B_3$ −2.12841E−02 | $B_4$ 2.25966E−02 | $B_5$ −9.44852E−02 | $B_6$ −4.80212E−02 |
| | | $B_7$ 6.18145E−02 | $B_8$ −3.45614E−02 | $B_9$ 8.09951E−04 | $B_{10}$ 7.85862E−04 |
| 4 | KA 1.00000E+00 | $B_3$ 5.11991E−02 | $B_4$ −1.02049E−01 | $B_5$ 5.31821E−02 | $B_6$ 8.55844E−02 |
| | | $B_7$ −1.20006E−02 | $B_8$ −1.60035E−01 | $B_9$ 2.60002E−05 | $B_{10}$ 4.88892E−05 |
| 5 | KA 1.00000E+00 | $B_3$ 3.61279E−02 | $B_4$ 1.04905E−02 | $B_5$ 8.55920E−02 | $B_6$ 1.11772E−01 |
| | | $B_7$ 4.26895E−03 | $B_8$ −4.16653E−02 | $B_9$ −6.85143E−05 | $B_{10}$ −1.51645E−04 |
| 6 | KA 1.00000E+00 | $B_3$ −1.64676E−01 | $B_4$ 4.06726E−02 | $B_5$ 1.10333E−01 | $B_6$ 2.53185E−02 |
| | | $B_7$ −2.74904E−02 | $B_8$ −1.92717E−02 | $B_9$ 1.21845E−03 | $B_{10}$ 4.13802E−03 |
| 7 | KA 1.00000E+00 | $B_3$ −2.33716E−01 | $B_4$ −3.83893E−02 | $B_5$ 7.51301E−02 | $B_6$ 6.58350E−03 |
| | | $B_7$ −1.64189E−02 | $B_8$ −5.05694E−04 | $B_9$ 4.53244E−03 | $B_{10}$ −1.72991E−03 |

FIG. 27A

AD: APERTURE DIAPHRAGM

| | EXAMPLE 13: BASIC LENS DATA | | | | |
|---|---|---|---|---|---|
| | Si (SURFACE NUMBER) | Ri (RADIUS OF CURVATURE) | Di (SURFACE SPACING) | Ndj (REFRACTIVE INDEX) | $\nu dj$ (ABBE NUMBER) |
| | 1 (AD) | — | 0.00 | | |
| L1 | 2 | 1.787 | 0.85 | 1.53156 | 55.1 |
| | 3 | ∞ | 1.08 | | |
| L2 | 4 | −1.314 | 0.58 | 1.60398 | 27.2 |
| | 5 | −1.741 | 0.18 | | |
| L3 | 6 | 3.714 | 0.73 | 1.53156 | 55.1 |
| | 7 | 2.577 | 0.30 | | |
| GC | 8 | ∞ | 0.18 | 1.51633 | 64.1 |
| | 9 | ∞ | 0.89 | | |

FIG. 27B

| EXAMPLE 13: ASPHERICAL DATA | | | | | |
|---|---|---|---|---|---|
| SURFACE NUMBER | COEFFICIENT | | | | |
| 2 | KA 1.00000E+00 | $B_3$ 1.16908E−03 | $B_4$ −1.54520E−02 | $B_5$ −2.27529E−02 | $B_6$ 1.41932E−02 |
| | | $B_7$ 3.61668E−03 | $B_8$ −4.39204E−02 | $B_9$ −9.65999E−05 | $B_{10}$ −1.36427E−04 |
| 3 | KA 1.00000E+00 | $B_3$ −2.27124E−02 | $B_4$ 7.92311E−03 | $B_5$ −7.06275E−02 | $B_6$ −1.77469E−02 |
| | | $B_7$ 6.33359E−02 | $B_8$ −7.37728E−02 | $B_9$ −1.96501E−05 | $B_{10}$ 9.12037E−06 |
| 4 | KA 1.00000E+00 | $B_3$ −7.52404E−02 | $B_4$ −1.25914E−01 | $B_5$ 1.11719E−01 | $B_6$ 1.47978E−01 |
| | | $B_7$ 1.67354E−02 | $B_8$ −1.29210E−01 | $B_9$ 9.70533E−06 | $B_{10}$ 3.88487E−05 |
| 5 | KA 1.00000E+00 | $B_3$ −2.53436E−01 | $B_4$ 7.51017E−02 | $B_5$ 7.73142E−02 | $B_6$ 1.07371E−01 |
| | | $B_7$ 1.74557E−02 | $B_8$ −3.65213E−02 | $B_9$ −6.99307E−05 | $B_{10}$ −2.58728E−04 |
| 6 | KA 1.00000E+00 | $B_3$ −2.83363E−01 | $B_4$ −1.52830E−03 | $B_5$ 9.79752E−02 | $B_6$ 1.85233E−02 |
| | | $B_7$ −2.47221E−02 | $B_8$ −8.38617E−03 | $B_9$ 6.94518E−04 | $B_{10}$ 2.27228E−03 |
| 7 | KA 1.00000E+00 | $B_3$ 2.04410E−02 | $B_4$ −2.26360E−01 | $B_5$ 7.51491E−02 | $B_6$ 1.78622E−02 |
| | | $B_7$ −1.29717E−02 | $B_8$ −1.93290E−05 | $B_9$ 2.00750E−03 | $B_{10}$ −9.70438E−04 |

FIG. 28A

| CONDITIONAL EXPRESSION | NUMBER OF CORRESPONDING EXPRESSION | VALUE RELATING TO CONDITIONAL EXPRESSION | | | | | |
|---|---|---|---|---|---|---|---|
| | | EX. 1 | EX. 2 | EX. 3 | EX. 4 | EX. 5 | EX. 6 |
| f/f3<0.95 | (1) | -0.538 | -2.070 | -0.010 | 0.602 | -2.304 | 0.926 |
| -2.5<f/f3<0 | (15) | -0.538 | -2.070 | -0.010 | 0.602 | -2.304 | 0.926 |
| BR2<0 | (2) | | 0.13 | | -0.33 | -0.007 | -1.23 |
| BR2<-0.2 | (2-1) | | 0.13 | | -0.33 | -0.007 | -1.23 |
| BR2<-0.32 | (2-2) | | 0.13 | | -0.33 | -0.007 | -1.23 |
| 0.22<(D3+D4)/f<0.43 | (3) | 0.287 | 0.416 | 0.300 | 0.406 | 0.373 | 0.482 |
| D4/f<0.136 | (6) | 0.148 | 0.165 | 0.140 | 0.127 | 0.137 | 0.114 |
| (D4+D6)/f<0.31 | (7) | 0.401 | 0.341 | 0.355 | 0.350 | 0.282 | 0.267 |
| D6/f≦0.155 | (8) | 0.253 | 0.176 | 0.216 | 0.223 | 0.145 | 0.153 |
| νd2>40 | (4),(5),(7) | 27.0 | 55.3 | 27.2 | 26.9 | 50.3 | 28.0 |
| -1.2<f3/f<0 | (4),(14) | -1.86 | -0.483 | -99.64 | 1.661 | -0.423 | 1.08 |
| -1.0<f3/f<0 | (4)' | -1.86 | -0.483 | -99.64 | 1.661 | -0.423 | 1.08 |
| f3/f<-0.4 | (10) | -1.86 | -0.483 | -99.64 | 1.661 | -0.423 | 1.08 |
| f3/f<-1.66 | (11) | -1.86 | -0.483 | -99.64 | 1.661 | -0.423 | 1.08 |
| 0<f2/f<2.0 | (5) | 3.317 | 0.557 | -4.733 | -1.32 | 0.51 | -2.663 |
| 0<f2/f<1.0 | (9) | 3.317 | 0.557 | -4.733 | -1.32 | 0.51 | -2.663 |
| -5.6<f2/f<-3.3 | (10) | 3.317 | 0.557 | -4.733 | -1.32 | 0.51 | -2.663 |
| 0.5<f2/f | (10A),(15) | 0.271 | 0.557 | -4.733 | -1.32 | 0.51 | -2.663 |
| 0.1<|f1/f2|<0.5 | (11) | 0.271 | 1.592 | -0.172 | -0.681 | 1.612 | -0.487 |
| 0.1<f1/f2<0.5 | (11)' | 0.271 | 1.592 | -0.172 | -0.681 | 1.612 | -0.487 |
| -0.5<f1/f2<-0.1 | (11)'' | 0.271 | 1.592 | -0.172 | -0.681 | 1.612 | -0.487 |
| -0.85<f2/{f3(45-vd2)}<-0.13 | (12) | -0.099 | 0.112 | 0.003 | -0.044 | 0.117 | -0.145 |
| f/R6<-0.4 | (13) | 0.964 | -1.88 | 1.360 | 2.172 | -1.962 | 1.836 |
| | | +  +  - | +  +  - | +  -  - | -  +  - | +  +  - | -  +  - |

▓ : VALUE WITHIN RANGE OF CONDITIONAL EXPRESSION

FIG. 28B

VALUE RELATING TO CONDITIONAL EXPRESSION

| CONDITIONAL EXPRESSION | NUMBER OF CORRESPONDING EXPRESSION | EX. 7 | EX. 8 | EX. 9 | EX. 10 | EX. 11 | EX. 12 | EX. 13 |
|---|---|---|---|---|---|---|---|---|
| $f/f3<0.95$ | (1) | -1.188 | -1.198 | -0.868 | -0.334 | -1.508 | -2.294 | -0.210 |
| $-2.5<f/f3<0$ | (15) | -1.188 | -1.198 | -0.868 | -0.334 | -1.508 | -2.294 | -0.210 |
| $BR2<0$ | (2) | -0.218 | 0.084 | 0.061 | | | | |
| $BR2<-0.2$ | (2-1) | -0.218 | 0.084 | 0.061 | | | | |
| $BR2<-0.32$ | (2-2) | -0.218 | 0.084 | 0.061 | | | | |
| $0.22<(D3+D4)/f<0.43$ | (3) | 0.451 | 0.387 | 0.400 | 0.240 | 0.248 | 0.254 | 0.386 |
| $D4/f<0.136$ | (6) | 0.123 | 0.129 | 0.128 | 0.115 | 0.137 | 0.115 | 0.136 |
| $(D4+D6)/f<0.31$ | (7) | 0.267 | 0.281 | 0.280 | 0.267 | 0.287 | 0.304 | 0.306 |
| $D6/f \leq 0.155$ | (8) | 0.139 | 0.153 | 0.152 | 0.153 | 0.155 | 0.187 | 0.170 |
| $\nu d2 > 40$ | (4),(5),(7) | 42.0 | 43.5 | 26.9 | 27.2 | 27.2 | 27.2 | 27.2 |
| $-1.2<f3/f<0$ | (4),(14) | -0.842 | -0.835 | -1.152 | -1.873 | -0.663 | -0.436 | -4.755 |
| $-1.0<f3/f<0$ | (4)' | -0.842 | -0.835 | -1.152 | -1.873 | -0.663 | -0.436 | -4.755 |
| $f3/f<-0.4$ | (10) | -0.842 | -0.835 | -1.152 | -1.873 | -0.663 | -0.436 | -4.755 |
| $f3/f<-1.66$ | (11) | -0.842 | -0.835 | -1.152 | -1.481 | -3.845 | -5.312 | -4.248 |
| $0<f2/f<2.0$ | (5) | 0.864 | 0.931 | 3.237 | -1.481 | -3.845 | -5.312 | -4.248 |
| $0<f2/f<1.0$ | (9) | 0.864 | 0.931 | 3.237 | -1.481 | -3.845 | -5.312 | -4.248 |
| $-5.6<f2/f<-3.3$ | (10) | 0.864 | 0.931 | 3.237 | -1.481 | -3.845 | -5.312 | -4.248 |
| $0.5<f2/f$ | (10A),(15) | 0.864 | 0.931 | 3.237 | -1.481 | -3.845 | -5.312 | -4.248 |
| $0.1<|f1/f2|<0.5$ | (11) | 1.146 | 0.931 | 0.245 | -0.440 | -0.153 | -0.106 | -0.184 |
| $0.1<f1/f2<0.5$ | (11)' | 1.146 | 0.931 | 0.245 | -0.440 | -0.153 | -0.106 | -0.184 |
| $-0.5<f1/f2<-0.1$ | (11)'' | 1.146 | 0.931 | 0.245 | -0.440 | -0.153 | -0.106 | -0.184 |
| $-0.85<f2/\{f3(45-vd2)\}<-0.13$ | (12) | -0.342 | -0.800 | -0.060 | 0.018 | 0.133 | 0.280 | 0.021 |
| $f/R6<-0.4$ | (13) | -0.525 | 0.409 | 0.551 | 0.759 | -0.970 | 2.286 | 1.158 |

: VALUE WITHIN RANGE OF CONDITIONAL EXPRESSION

FIG. 29

| CORRESPONDENCE RELATIONSHIP BETWEEN EACH CONSTITUTION GROUP AND EXAMPLE | | |
|---|---|---|
| CONSTITUTION GROUP | CONDITIONAL EXPRESSION | CORRESPONDING EXAMPLE |
| 1-1 (FIRST BASIC CONSTITUTION) | EXPRESSION (1), EXPRESSION (2) | EXAMPLE 4 ~ 7 |
| 1-2 | 1-1 AND EXPRESSION (3) | EXAMPLE 4, 5 |
| 1-3 | 1-1 OR 1-2 AND EXPRESSION (4) | EXAMPLE 5, 7 OR EXAMPLE 5 |
| 1-4 | 1-1 AND EXPRESSION (5) | EXAMPLE 5, 7 |
| 2-1 (SECOND BASIC CONSTITUTION) | EXPRESSION (1), EXPRESSION (6) | EXAMPLE 4, 6 ~ 13 |
| 2-2 | 2-1 AND EXPRESSION (3) | EXAMPLE 4, 8 ~ 13 |
| 2-3 | 2-2 AND EXPRESSION (7) | EXAMPLE 8 ~ 13 |
| 2-4 | 2-2 OR 2-3 AND EXPRESSION (8) | EXAMPLE 8 ~ 11 |
| 2-5 | 2-1 AND EXPRESSION (10) | EXAMPLE 11 ~ 13 |
| 2-6 | 2-1 AND EXPRESSION (4) | EXAMPLE 7 ~ 9, 11, 12 |
| 2-7 | 2-1 AND EXPRESSION (11) | EXAMPLE 10, 13 |
| 2-8 | 2-1 AND EXPRESSION OF f1/f2 | EXAMPLE 10, 13 |
| 3-1 (THIRD BASIC CONSTITUTION) | EXPRESSION (3), EXPRESSION (10) | EXAMPLE 3, 11 ~ 13 |
| 4-1 (FOURTH BASIC CONSTITUTION) | EXPRESSION (3), EXPRESSION (11) | EXAMPLE 1, 3, 10 |
| 5-1 (FIFTH BASIC CONSTITUTION) | EXPRESSION (13) | EXAMPLE 2, 5, 7 |
| 5-2 | 5-1 AND EXPRESSION (14) | EXAMPLE 2, 5, 7 |
| 5-3 | 5-1 AND EXPRESSION (9) | EXAMPLE 2, 5, 7 |
| 5-4 | 5-1 AND EXPRESSION (4) | EXAMPLE 2, 5, 7 |

EXAMPLE 1

SPHERICAL ABERRATION

ASTIGMATISM

DISTORTION

EXAMPLE 2

SPHERICAL ABERRATION

ASTIGMATISM

DISTORTION

EXAMPLE 3

SPHERICAL ABERRATION

ASTIGMATISM

DISTORTION

EXAMPLE 4

SPHERICAL ABERRATION

ASTIGMATISM

DISTORTION

EXAMPLE 5

SPHERICAL ABERRATION

ASTIGMATISM

DISTORTION

EXAMPLE 6

SPHERICAL ABERRATION

ASTIGMATISM

DISTORTION

EXAMPLE 7

SPHERICAL ABERRATION

ASTIGMATISM

DISTORTION

EXAMPLE 8

SPHERICAL ABERRATION

ASTIGMATISM

DISTORTION

EXAMPLE 9

SPHERICAL ABERRATION

ASTIGMATISM

DISTORTION

EXAMPLE 10

SPHERICAL ABERRATION

ASTIGMATISM

DISTORTION

EXAMPLE 11

SPHERICAL ABERRATION

ASTIGMATISM

DISTORTION

EXAMPLE 12

SPHERICAL ABERRATION

ASTIGMATISM

DISTORTION

EXAMPLE 13

IMAGING LENS

BACKGROUND OF THE INVENTION

1. Field of the Invention

The present invention relates to an imaging lens which forms an optical image of a subject on an imaging element such as a CCD (Charge-Coupled Device) or a CMOS (Complementary Metal Oxide Semiconductor), and relates to a fixed-focus imaging lens suitable for a camera module for converting the optical image formed by the imaging lens into an image signal, and a camera-equipped portable cellular phone or an information portable terminal (PDA: Personal Digital Assistance), which is equipped with the imaging lens to capture an image.

2. Description of Related Art

Significant progress has recently been made toward miniaturization and an increased number of pixels of an imaging element, such as a CCD or a CMOS. To this end, a compact, high-performance imaging device main unit and a lens mounted on the main unit are sought. In order to address an imaging element having a larger number of pixels, telecentricity; that is, a property for rendering an angle of incidence of a principal ray to an imaging element closely parallel to an optical axis (i.e., the angle of incidence to an imaging surface close to a value of zero with respect to the normal to the imaging surface), has been sought. A lens of a three-lens configuration has hitherto been developed as a compact imaging lens (see JP-A-2003-322792, JP-A-2005-352317, JP-A-2005-17440, JP-A-2005-292235, JP-A-2005-345919, JP-A-2004-4566, JP-A-2004-226487, JP-A-2004-240063 and JP-A-2006-47858). JP-A-2003-322792 and JP-A-2005-352317 and JP-A-2005-17440 (a first example) describe an imaging lens of a so-called middle aperture configuration in which an aperture diaphragm is interposed between a first lens and a second lens. However, in the case of the middle aperture configuration, when an attempt is made to shorten the entire length of a lens system, the angle of incidence of the principal ray to the imaging surface becomes greater, which in turn worsens the telecentricity. Accordingly, a conceivable layout is to place the aperture diaphragm at a position closest to an object side in order to ensure the telecentricity. JP-A-2005-17440 (a second embodiment) and JP-A-2005-292235, JP-A-2005-345919, JP-A-2004-4566, JP-A-2004-226487, JP-A-2004-240063 and JP-A-2006-47858 describe an imaging lens of a three-lens configuration in which an aperture diaphragm is placed at a position closest to the object side.

Development of a lens exhibiting higher optical performance is expected in step with an increase in the number of pixels of the imaging element. Development of an imaging lens whose curvature of field and chromatic aberration are properly corrected while being miniaturized has been desired. When the aperture diaphragm is placed at the position closest to the object side, variations in sensitivity due to manufacture (i.e., the degree of change in optical performance ascribable to variations in manufacture) tend to increase, and mass-production suitability of the imaging lens tends to become worse. Accordingly, development of an imaging lens whose telecentricity is ensured by placing an aperture diaphragm at a position closest to an object side and whose change-in-manufacture sensitivity is reduced has been desired.

SUMMARY OF THE INVENTION

An object of an illustrative, non-limiting embodiment of the invention is to provide a compact, high-performance imaging lens having a three-lens configuration, which can properly correct aberrations in agreement with an increase in the number of pixels.

According to a first aspect of the invention, there is provided an imaging lens having a three-lens configuration, which includes an aperture diaphragm, a first lens, a second lens, and a third lens provided in order from the object side. The first lens is a positive lens having a convex surface on the object side; the second lens is a meniscus lens having a concave surface on the object side; and conditional expressions provided below are satisfied:

$$f/f3 < 0.95 \tag{1}$$

$$BR2 < 0 \tag{2}$$

wherein BR2 satisfies $BR = A/D4$, A represents a distance from a vertex position on a object-side surface of the second lens and on an optical axis to a position on a image-side surface of the second lens through which a light ray passes toward a corner of an image height, provided that a traveling direction of the light ray is taken as appositive direction, and D4 represents a center thickness of the second lens; f represents a focal length of the entire system (i.e., the imaging lens); and f3 represents a focal length of the third lens.

The imaging lens of the first aspect is configured by a small number of lenses, that is a total of three lenses, and configurations of the respective lenses are made optimum, whereby an attempt is made to miniaturize and enhance the performance of the imaging lens. In particular, since the aperture diaphragm is placed at a position on the object side of the first lens, it becomes easy to shorten the entire length of the imaging lens and achieve telecentricity; namely, a property of rendering an angle of incidence of a principal light ray on an imaging surface closer to normal (i.e., parallel to an optical axis). Thus, optical performance advantageous to a characteristic of an imaging element is acquired. Moreover, as a result of, in particular, the conditional expression (2), a rear surface (an image-side surface) of the second lens at the periphery is situated at a position closer to the object side than to a vertex position P1 on the optical axis and a front surface (an object-side surface) of the second lens. As a result, an angle of exit of the light ray can be made obtuse, and the lens becomes advantageous primarily in compensation for a curvature of field and a distortion. Moreover, power of the third lens is optimized by satisfaction of the conditional expression (1), whereby the lens becomes advantageous primarily in compensation for the curvature of field and a chromatic aberration. Thus, high optical performance addressing an increase in the number of pixels can be attained.

In the imaging lens of the first aspect, the following conditions may be satisfied, as appropriate, in order to achieve much superior optical performance or much superior suitability for production.

$$0.22 < (D3+D4)/f < 0.43 \tag{3}$$

wherein f represents a focal length of the entire system; D3 represents a surface spacing between a rear surface (an image-side surface) of the first lens and a front surface (an object-side surface) of the second lens along the optical axis; and D4 represents a center thickness of the second lens.

$$vd2 > 40 \text{ and } -1.2 < f3/f < 0.0 \tag{4}$$

wherein vd2 represents an Abbe number of the second lens at the d-line; f represents a focal length of the entire system; and f represents a focal length of the third lens $$vd2>40 \text{ and } 0.0<f2/f<2.0 \quad (5)$$

wherein vd2 is an Abbe number of the second lens at the d-line; f represents a focal length of the entire system; and f2 represents a focal length of the second lens.

According to a second aspect of the invention, there is provided an imaging lens having a three-lens configuration, which includes an aperture diaphragm, a first lens, a second lens, and a third lens provided in order from the object side. The first lens is a positive lens having a convex surface on the object side; the second lens has a concave surface on the object side; and conditional expressions provided below are satisfied.

$$f/f3<0.95 \quad (1)$$

$$D4/f<0.136 \quad (6)$$

wherein D4 is a center thickness of the second lens; f represents a focal length of the entire system; and f3 represents a focal length of the third lens.

The imaging lens of the second aspect is configured by a small number of lenses, that is a total of three lenses, and configurations of the respective lenses are made optimum, whereby an attempt is made to miniaturize and enhance the performance of the imaging lens. In particular, since the aperture diaphragm is placed at a position on the object side of the first lens, it becomes easy to shorten the entire length of the imaging lens and achieve telecentricity; namely, a property of rendering an angle of incidence of a principal light ray on an imaging surface closer to normal (i.e., parallel to an optical axis). Thus, optical performance advantageous to a characteristic of an imaging element is acquired. Moreover, as a result of, in particular, the conditional expression (6), the center thickness of the second lens becomes comparatively small, and the angle of exit of the light ray is maintained appropriately, and superior resolution performance becomes easy to maintain. Further, the entire length of the imaging lens can be reduced comparatively easily while variations in sensitivity due to manufacture are reduced. Moreover, material cost can also be reduced. Power of the third lens is optimized by satisfaction of the conditional expression (1), whereby the lens becomes advantageous primarily in compensation for the curvature of field and the chromatic aberration. Thus, high optical performance addressing an increase in the number of pixels can be attained.

In the imaging lens of the second aspect, the following conditions may be satisfied, as appropriate, in order to achieve much superior optical performance or much superior suitability for production.

$$f3/f<-0.4 \text{ and } -5.6<f2/f<-3.3 \quad (10)$$

wherein f represents a focal length of the entire system; f2 represents a focal length of the second lens, and f3 represents a focal length of the third lens.

$$vd2>40 \text{ and } -1.2<f3/f<0.0 \quad (4)$$

wherein vd2 represents an Abbe number of the second lens at the d-line; f represents a focal length of the entire system; and f3 represents a focal length of the third lens.

$$f3/f<-1.66 \text{ and } 0.1<|f1/f2|<0.5 \quad (11)$$

wherein f represents a focal length of the entire system; f1 represents a focal length of the first lens; f2 represents a focal length of the second lens; and f3 represents a focal length of the third lens.

$$-0.5<f1/f2<-0.1$$

wherein f1 represents a focal length of the first lens; and f2 represents a focal length of the second lens.

$$0.22<(D3+D4)/f<0.43 \quad (3)$$

wherein f represents a focal length of an entire system; D3 represents a surface spacing between a rear surface (an image-side surface) of the first lens and a front surface (an object-side surface) of the second lens along the optical axis; and D4 represents a center thickness of the second lens.

$$vd2>40 \text{ and } (D4+D6)/f<0.31 \quad (7)$$

wherein vd2 represents an Abbe number of the second lens at the d-line; f represents a focal length of the entire system; D4 represents a center thickness of the second lens; and D6 represents a center thickness of the third lens.

$$D6/f \leq 0.155 \quad (8)$$

wherein f represents a focal length of the entire system; and D6 represents a center thickness of the third tens.

According to a third aspect of the invention, there is provided an imaging lens having a three-lens configuration, which includes an aperture diaphragm, a first lens, a second lens, and a third lens provided in order from the object side. The first lens is a positive lens having a convex surface on the object side; the second lens has a concave surface on the object side and has a negative refractive power; the third lens has a negative refractive power; and conditional expressions provided below axe satisfied:

$$0.22<(D3+D4)/f<0.43 \quad (3)$$

$$f3/f<-0.4 \text{ and } -5.6<f2/f<-3.3 \quad (10)$$

wherein f is represents a focal length of the entire system; f2 represents a focal length of the second lens; f3 represents a focal length of the third lens; D3 represents a surface spacing between a rear surface (an image-side surface) of the first lens and a front surface (an object-side surface) of the second lens along the optical axis; and D4 is a center thickness of the second lens.

The imaging lens of the third aspect is configured by a small number of lenses, that is a total of three lenses, and configurations of the respective lenses are made optimum, whereby an attempt is made to miniaturize and enhance the performance of the imaging lens. In particular, since the aperture diaphragm is placed at a position on the object side of the first lens, it becomes easy to shorten the entire length of the imaging lens and achieve telecentricity; namely, a property of rendering an angle of incidence of a principal light ray on an imaging surface closer to normal (i.e., parallel to an optical axis). Thus, optical performance advantageous to a characteristic of an imaging element is acquired. Thus, optical performance advantageous to a characteristic of an imaging element is acquired. Moreover, as a result of, in particular, the conditional expression (3), it becomes easy to maintain the angle of exit of the light ray while the entire length of the imaging lens is controlled, and the lens becomes advantageous in compensation for the curvature of field. A power balance between the second lens and the third lens is optimized by satisfaction of the conditional expression (10), whereby the lens becomes advantageous in compensation for various aberrations. Thus, high optical performance addressing an increase in the number of pixels can be attained.

According to a fourth aspect of the invention, there is provided an imaging lens having a three-lens configuration, which includes an aperture diaphragm, a first lens, a second lens, and a third lens provided in order from the object side. The first lens is a positive lens having a convex surface on the object side; the second lens has a concave surface on the object side and has a negative refractive power; the third lens has a negative refractive power; and conditional expressions provided below are satisfied $$0.22 < (D3+D4)/f < 0.43 \quad (3)$$

$$f3/f < -1.66 \text{ and } 0.1 < |f1/f2| < 0.5 \quad (11)$$

where f represents a focal length of the entire system; f1 represents a focal length of the first lens; f2 represents a focal length of the second lens; f3 represents a focal length of the third lens; D3 represents a surface spacing between a rear surface (an image-side surface) of the first lens and a front surface (an object-side surface) of the second lens along the optical axis; and D4 is a center thickness of the second lens.

The imaging lens of the fourth aspect is configured by a small number of lenses, that is a total of three lenses, and configurations of the respective lenses are made optimum, whereby an attempt is made to miniaturize and enhance the performance of the imaging lens. In particular, since the aperture diaphragm is placed at a position on the object side of the first lens, it becomes easy to shorten the entire length of the imaging lens and achieve telecentricity; namely, a property of rendering an angle of incidence of a principal light ray on an imaging surface closer to normal (i.e., parallel to an optical axis). Thus, optical performance advantageous to a characteristic of an imaging element is acquired. Thus, optical performance advantageous to a characteristic of an imaging element is acquired. Moreover, as a result of, in particular, the conditional expression (3), it becomes easy to maintain the angle of exit of the light ray while the entire length of the imaging lens is controlled, and the lens becomes advantageous in compensation for the curvature of field. A power balance between the first lens, the second lens, and the third lens is optimized by satisfaction of the conditional expression (11) whereby the lens becomes advantageous in compensation for various aberrations. Thus, high optical performance addressing an increase in the number of pixels can be attained.

According to a fifth aspect of the invention, there is provided an imaging lens having a three-lens configuration, which includes an aperture diaphragm, a first lens having a positive refractive power, a second lens having a positive refractive power, and a third lens having a negative refractive power. An object-side surface of the third lens is concave in the vicinity of then optical axis and an image-side surface of the third lens is convex at the periphery thereof, and conditional expressions provided below are satisfied, $$0.22 < (D3+D4)/f < 0.43 \quad (3)$$

$$f/R6 < -0.4 \quad (13)$$

wherein f represents a focal length of the entire system; D3 represents a surface spacing between a rear surface (an image-side surface) of the first lens and a front surface (an object-side surface) of the second lens along the optical axis; D4 is a center thickness of the second lens; and R6 represents a paraxial radius of curvature of an object-side surface of the third lens.

The imaging lens of the fifth aspect is configured by a small number of lenses, that is a total of three lenses, and configurations of the respective, lenses are made optimum, whereby an attempt is made to miniaturize and enhance the performance of the imaging lens. In particular, since the aperture diaphragm is placed at a position on the object side of the first lens, it becomes easy to shorten the entire length of the imaging lens and achieve telecentricity; namely, a property of rendering an angle of incidence of a principal light ray on an imaging surface closer to normal (i.e., parallel to an optical axis). Thus, optical performance advantageous to a characteristic of an imaging element is acquired. Thus, optical performance advantageous to a characteristic of an imaging element is acquired. In particular, the shape of the third lens situated at the position closest to the imaging plane side is optimized, and hence assurance of telecentricity become easy while the curvature of field and the distortion are properly compensated for. Thus, high optic performance addressing an increase in the number of pixels can be attained.

In the imaging lens of the fifth aspect, the following conditions may be satisfied, as appropriate, in order to achieve much superior optical performance.

$$0 < f2/f < 1 \quad (9)$$

wherein f represents a focal length of the entire system; and f2 represents a focal length of the second lens, $$vd2 > 40 \text{ and } -1.2 < f3/f < 0.0 \quad (4)$$

wherein vd2 is an Abbe number of the second lens at the d-line; f represents a focal length of the entire system and f3 represents a focal length of the third lens.

$$-1.2 < f3/f < 0.0 \quad (14)$$

wherein f represents a focal length of the entire system; and f3 represents a focal length of the third lens.

In the imaging lens having a three-lens configuration according to each of the aspects, the first lens, the second lens, and the third lens are preferably aspherical lenses. As a result of the aspherical shapes of the respective lenses being optimized, the lenses become advantageous primarily in compensation for the curvature of field and the distortion, and much superior optical performance is achieved.

For example, the image-side surface of the first lens preferably assumes such an aspherical shape that the shape of the image-side surface changes toward the object side with increasing proximity to the periphery as does in the vicinity of the optical axis. For instance, the image-side surface preferably assumes a concave shape or a shape close to a plane in the vicinity of the optical axis, assuming such an aspherical shape as to become convex with increasing proximity to the periphery.

Moreover, the object-side surface of the second lens preferably assumes such an aspherical shape that the shape of the object-side surface changes toward the object side with increasing proximity to the periphery as does in the vicinity of the optical axis. For example, a preferred shape is that a concave shape is achieved in the vicinity of the optical axis and that an absolute value of radius of curvature becomes smaller than that achieved in the vicinity of the optical axis with increasing proximity to the periphery.

Further, the image-side surface of the third lens preferably assumes such an aspherical shape that the shape of the image-side surface changes up to any point with increasing proximity to the periphery as does in the vicinity of the optical axis, but finally changes toward the object side. For example, a preferred shape is that a concave shape is achieved in the vicinity of the optical axis; that the concave shape having a large absolute value of radius of curvature up to any point; and that the shape becomes convex with increasing proximity to the periphery.

BRIEF DESCRIPTION OF THE DRAWINGS

The features of the invention will appear more fully upon consideration of the exemplary embodiment of the invention, which are schematically set forth in the drawings, in which:

FIG. 15 is a view showing lens data pertaining to the imaging lens of the first example, wherein FIG. 15A shows basic lens data and FIG. 15B shows lens data pertaining to aspherical surfaces;

FIG. 16 is a view showing lens data pertaining to the imaging lens of the second example, wherein FIG. 16A shows basic lens data and FIG. 16B shows lens data pertaining to aspherical surfaces;

FIG. 17 is a view showing lens data pertaining to the imaging lens of the third example, wherein FIG. 17A shows basic lens data and FIG. 17B shows lens data pertaining to aspherical surfaces;

FIG. 18 is a view showing tens data pertaining to the imaging lens of the fourth example, wherein FIG. 18A shows basic tens data and FIG. 18B shows lens data pertaining to aspherical surfaces;

FIG. 19 is a view showing lens data pertaining to the imaging lens of the fifth example, wherein FIG. 19A shows basic lens data and FIG. 19B shows lens data pertaining to aspherical surfaces;

FIG. 20 is a view showing lens data pertaining to the imaging lens of the sixth example, wherein FIG. 20A shows basic lens data and FIG. 20B shows lens data pertaining to aspherical surfaces;

FIG. 21 is a view showing lens data pertaining to the imaging lens of the seventh example, wherein FIG. 21A shows basic lens data and FIG. 21B shows lens data pertaining to aspherical surfaces;

FIG. 22 is a view showing tens data pertaining to the imaging lens of the eighth example, wherein FIG. 22A shows basic lens data and FIG. 22B shows lens data pertaining to aspherical surfaces;

FIG. 23 is a view showing lens data pertaining to the imaging lens of the ninth example, wherein FIG. 23A shows basic lens data and FIG. 23B shows lens data pertaining to aspherical surfaces;

FIG. 24 is a view showing lens data pertaining to the imaging lens of the tenth example, wherein FIG. 24A shows basic lens data and FIG. 24B shows lens data pertaining to aspherical surfaces;

FIG. 25 is a view showing lens data pertaining to the imaging lens of the eleventh example, wherein FIG. 25A shows basic lens data and FIG. 25B shows lens data pertaining to aspherical surfaces;

FIG. 26 is a view showing lens data pertaining to the imaging lens of the twelfth example, wherein FIG. 26A shows basic lens data and FIG. 26B shows lens data pertaining to aspherical surfaces;

FIG. 27 is a view showing lens data pertaining to the imaging lens of the thirteenth example, wherein FIG. 27A shows basic lens data and FIG. 27B shows lens data pertaining to aspherical surfaces;

FIG. 28 is a view showing values relating conditional expressions;

FIG. 29 is a view showing a summary of correspondences between conditional expressions and the examples;

FIG. 30 is an aberration chart showing various aberrations of the imaging lens of the first example, wherein

FIG. 31 is an aberration chart showing various aberrations of the imaging lens of the second example, wherein

FIG. 32 is an aberration cha showing various aberrations of the imaging lens of the third example, wherein

FIG. 33 is an aberration chart showing various aberrations of the imaging lens of the fourth example, wherein

FIG. 34 is an aberration chart showing various aberrations of the imaging lens of the fifth example, wherein

FIG. 35 is an aberration chart showing various aberrations of the imaging lens of the sixth example, wherein

36A shows a spherical aberration, FIG. 26B shows an astigmatism.

FIG. 37 is an aberration chart showing various aberrations of the imaging lens of the eighth example, wherein

FIG. 38 is an aberration chart showing various aberrations of the imaging lens of the ninth example, wherein

FIG. 39 is an aberration chart showing various aberrations of the imaging lens of die tenth example, wherein

FIG. 40 is an aberration chart showing various aberrations of the imaging lens of the eleventh example, wherein

FIG. 41 is an aberration chart showing various aberrations of the imaging lens of the twelfth example, wherein

FIG. 42 is an aberration chart showing various aberrations of the imaging lens of the thirteenth example, wherein

DETAILED DESCRIPTION OF THE EXEMPLARY EMBODIMENTS

Although the invention will be described below with reference to exemplary embodiments thereof the following exemplary embodiments and modifications do not restrict the invention.

An imaging lens having a three-lens configuration according to each of the aspects is configured by a small number of lenses, that is a total of three lenses, and configurations of the respective lenses are made optimum. Accordingly, a compact, high-performance imaging lens system whose aberrations are properly compensated for in accordance with an increase in the number of pixels can be embodied. Much superior optical performance can be obtained by satisfaction of preferred conditions, as required. Alternatively, superior suitable for mass-production can be achieved.

Exemplary embodiments of the present invention will be described in detail hereunder by reference to the drawings.

Figure 1:
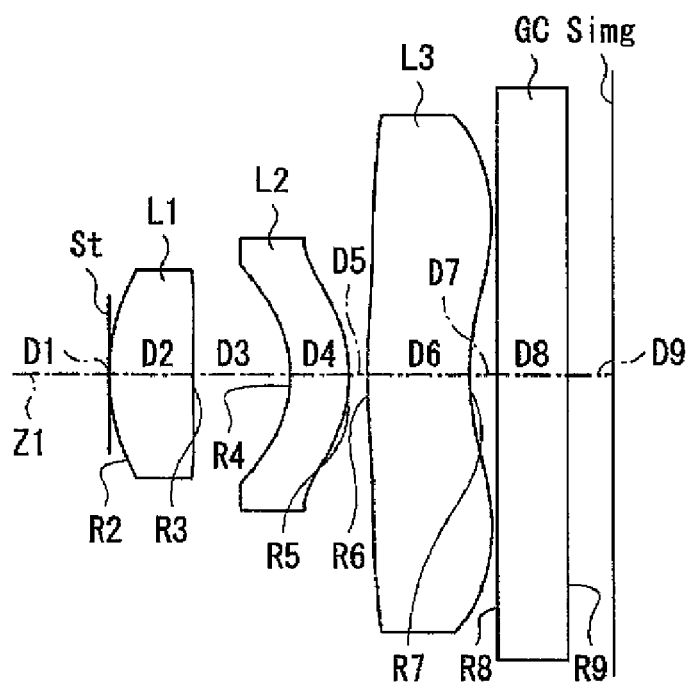
FIG. 1 is a lens cross-sectional profile corresponding to an imaging lens of a first exemplary example of the present invention.
Figure 2:
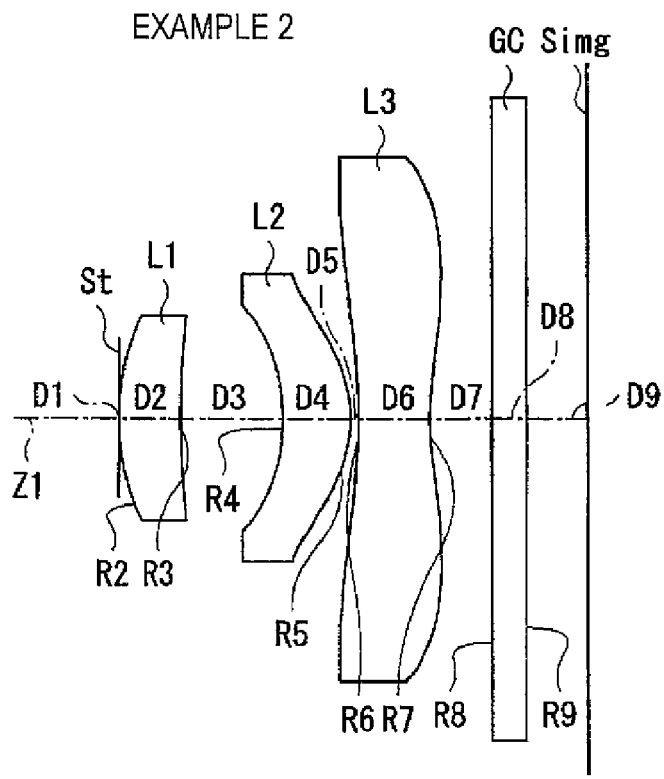
FIG. 2 is a lens cross-sectional profile corresponding to an imaging lens of a second exemplary example of the present invention.
Figure 3:
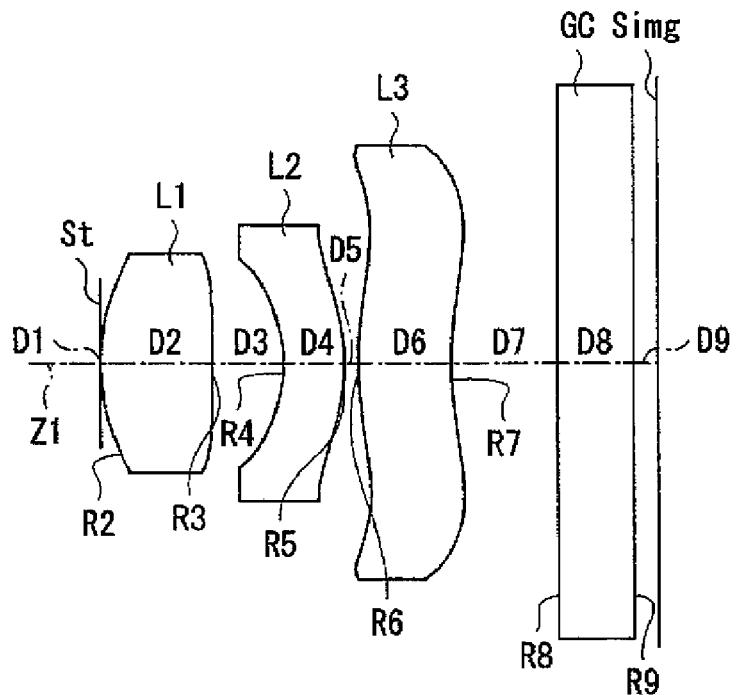
FIG. 3 is a lens cross-sectional profile corresponding to an imaging lens of a third exemplary example of the present invention.
Figure 4:
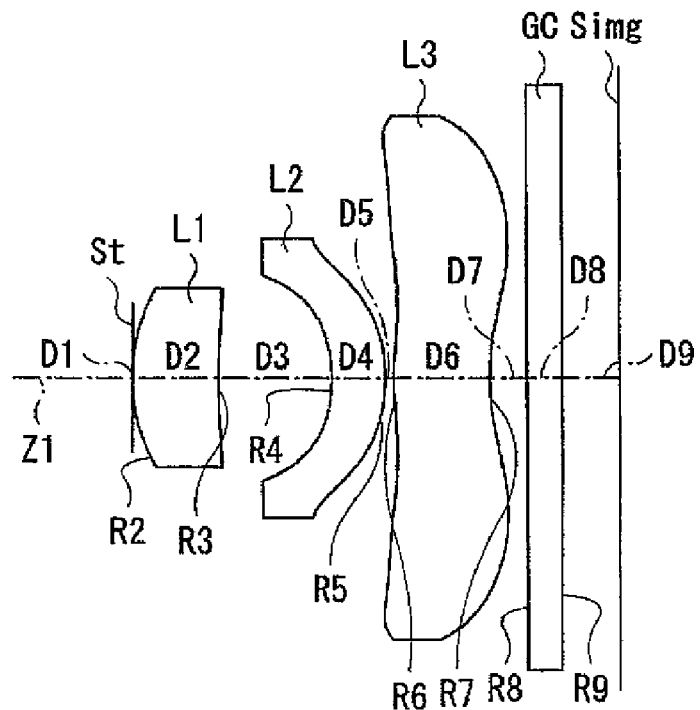
FIG. 4 is a lens cross-sectional profile corresponding to an imaging lens of a fourth exemplary example of the present invention.
Figure 5:
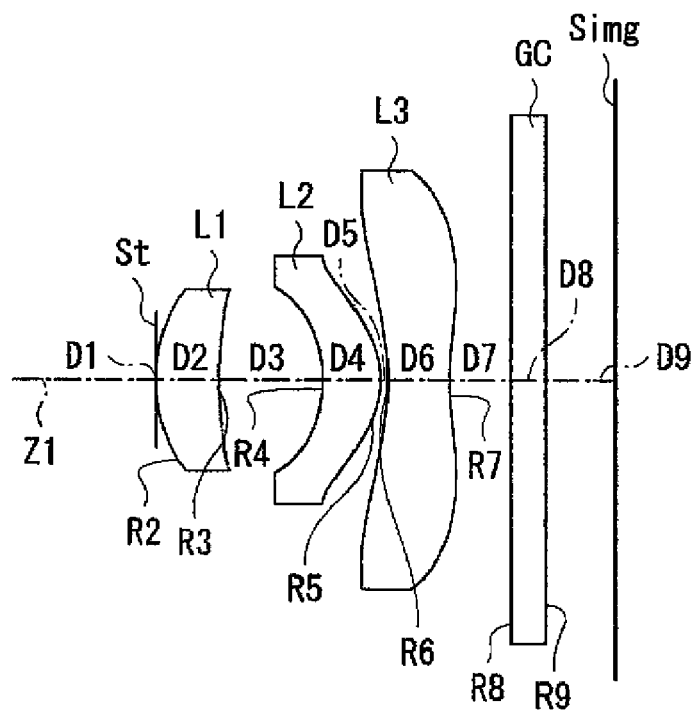
FIG. 5 is a lens cross-sectional profile corresponding to an imaging lens of a fifth exemplary example of the present invention.
Figure 6:
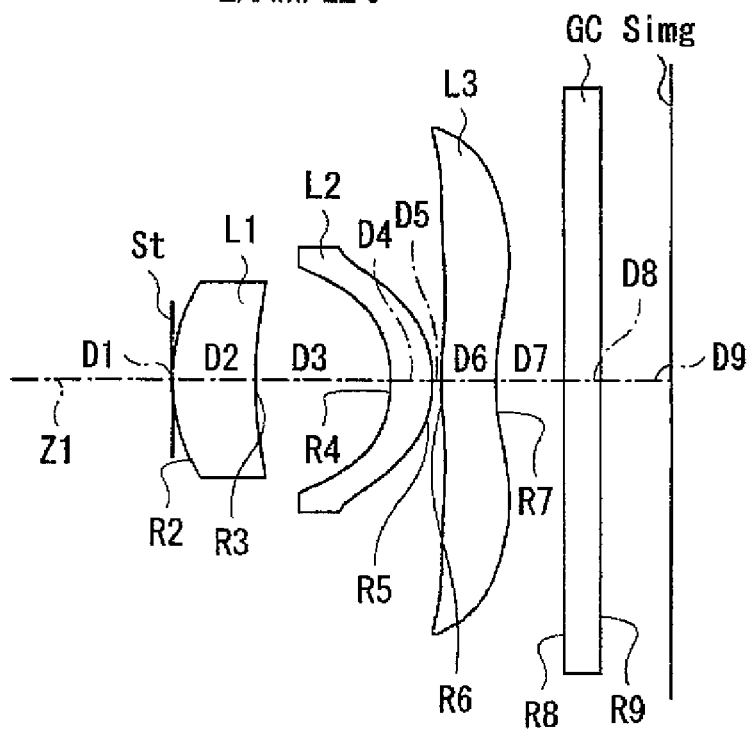
FIG. 6 is a lens cross-sectional profile corresponding to an imaging lens of a sixth exemplary example of the present invention.
Figure 7:
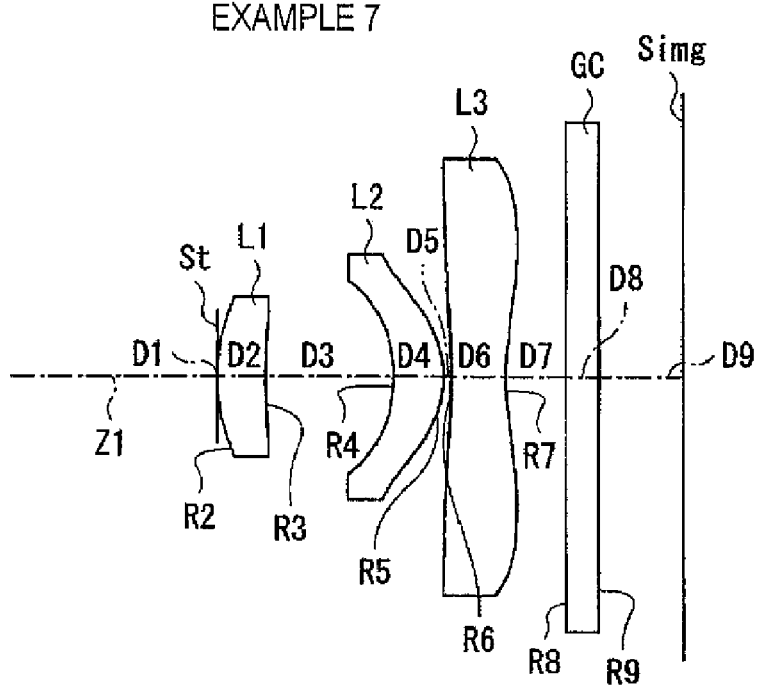
FIG. 7 is a lens cross-sectional profile corresponding to an imaging lens of a seventh exemplary example of the present invention.
Figure 8:
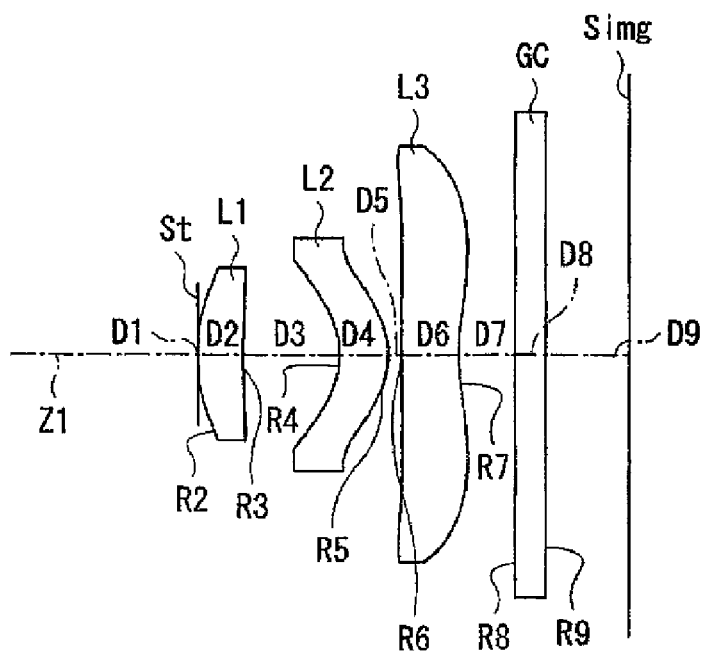
FIG. 8 is a lens cross-sectional profile corresponding to an imaging lens of an eighth exemplary example of the present invention.
Figure 9:
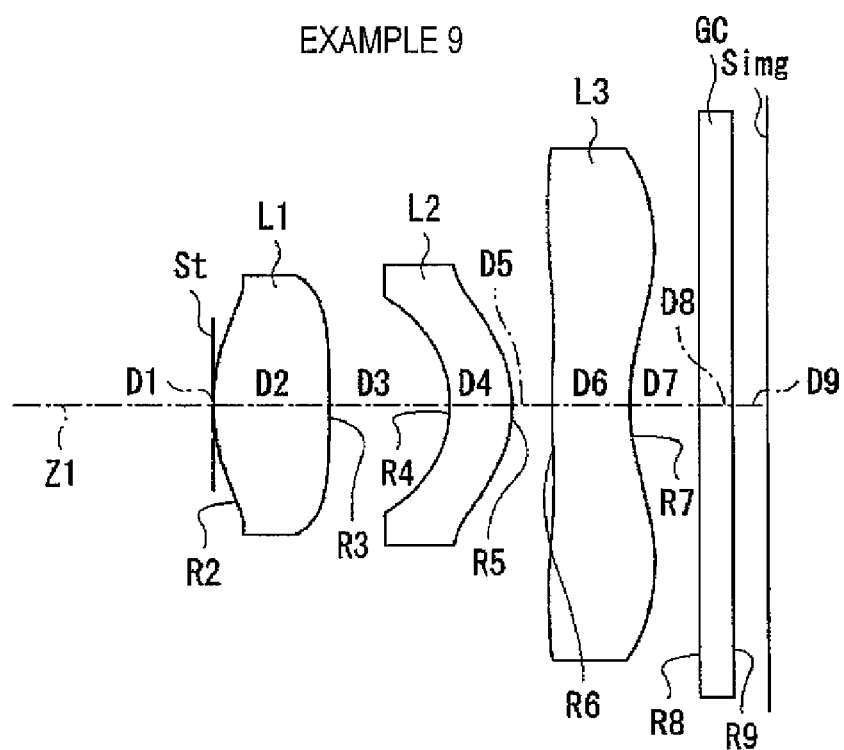
FIG. 9 is a lens cross-sectional profile corresponding to an imaging lens of a ninth exemplary example of the present invention.
Figure 10:
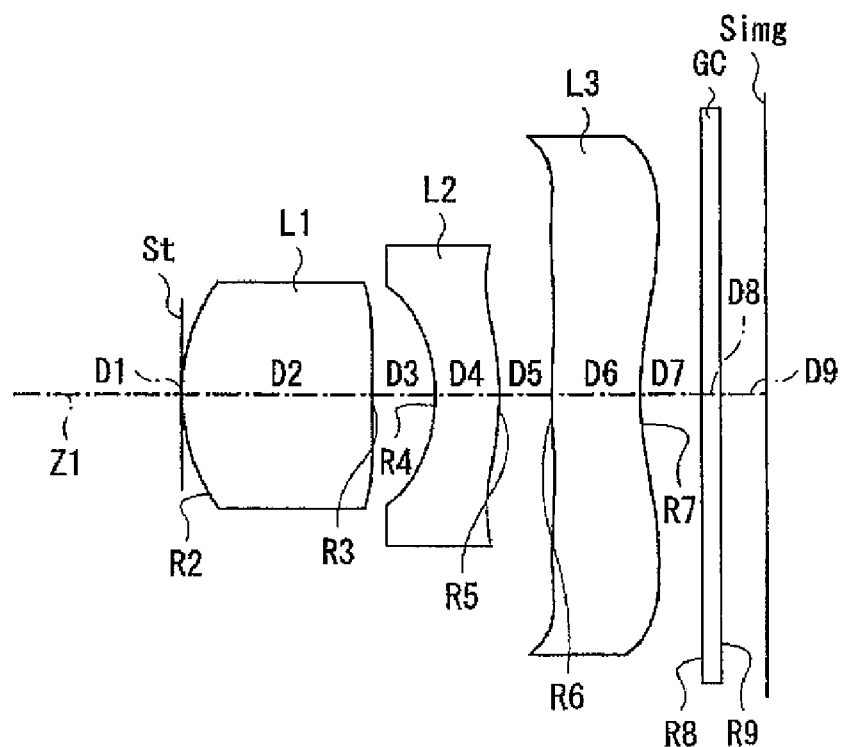
FIG. 10 is a lens cross-sectional profile corresponding to an imaging lens of a tenth exemplary example of the present invention.
Figure 11:
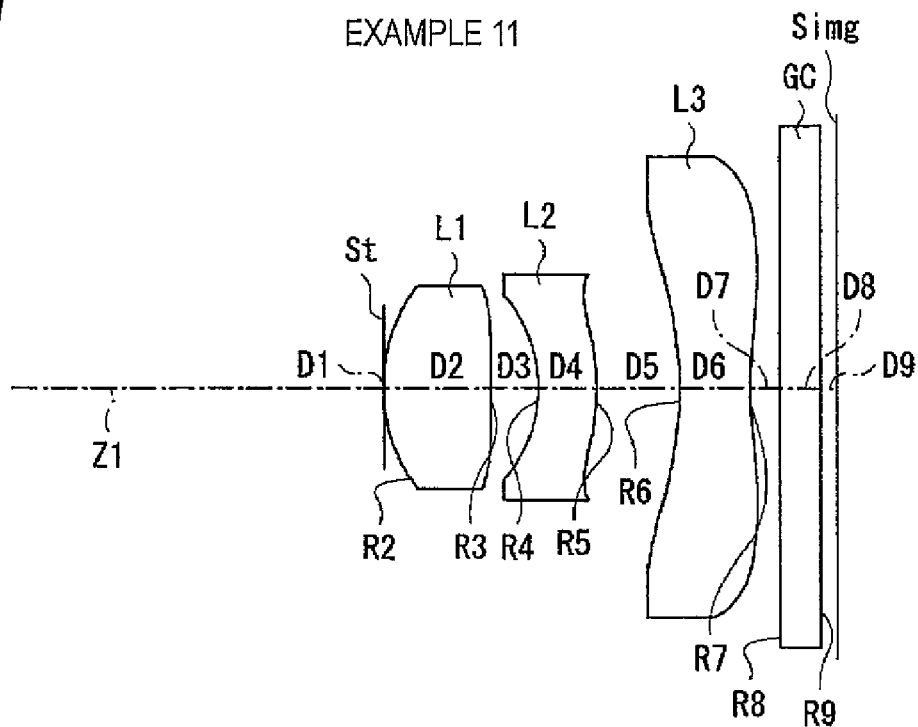
FIG. 11 is a lens cross-sectional profile corresponding to an imaging lens of an exemplary eleventh example of the present invention.
Figure 12:
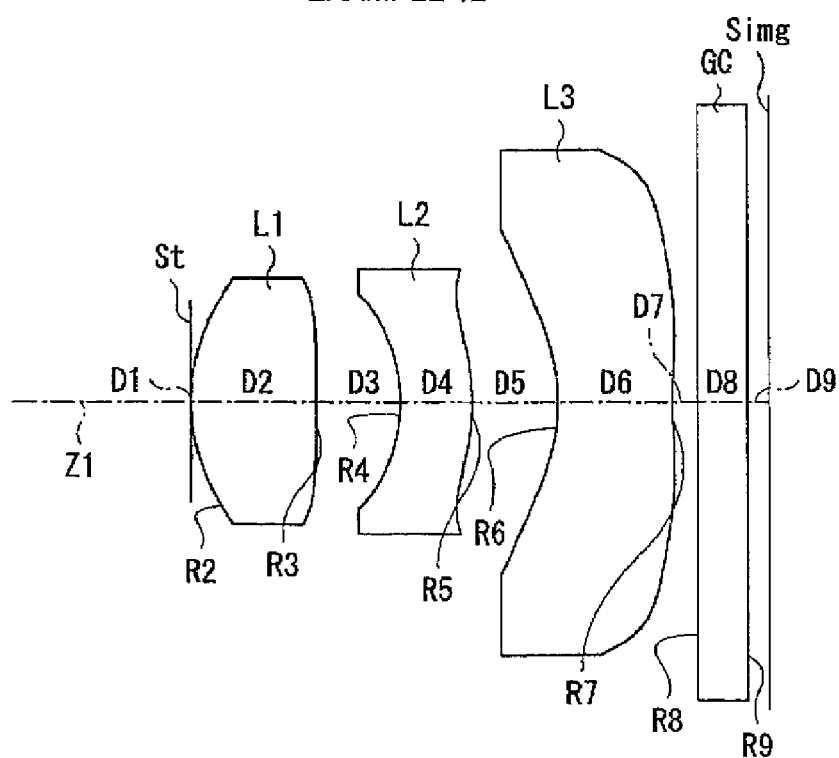
FIG. 12 is a lens cross-sectional profile corresponding to an imaging lens of a twelfth exemplary example of the present invention.
Figure 13:
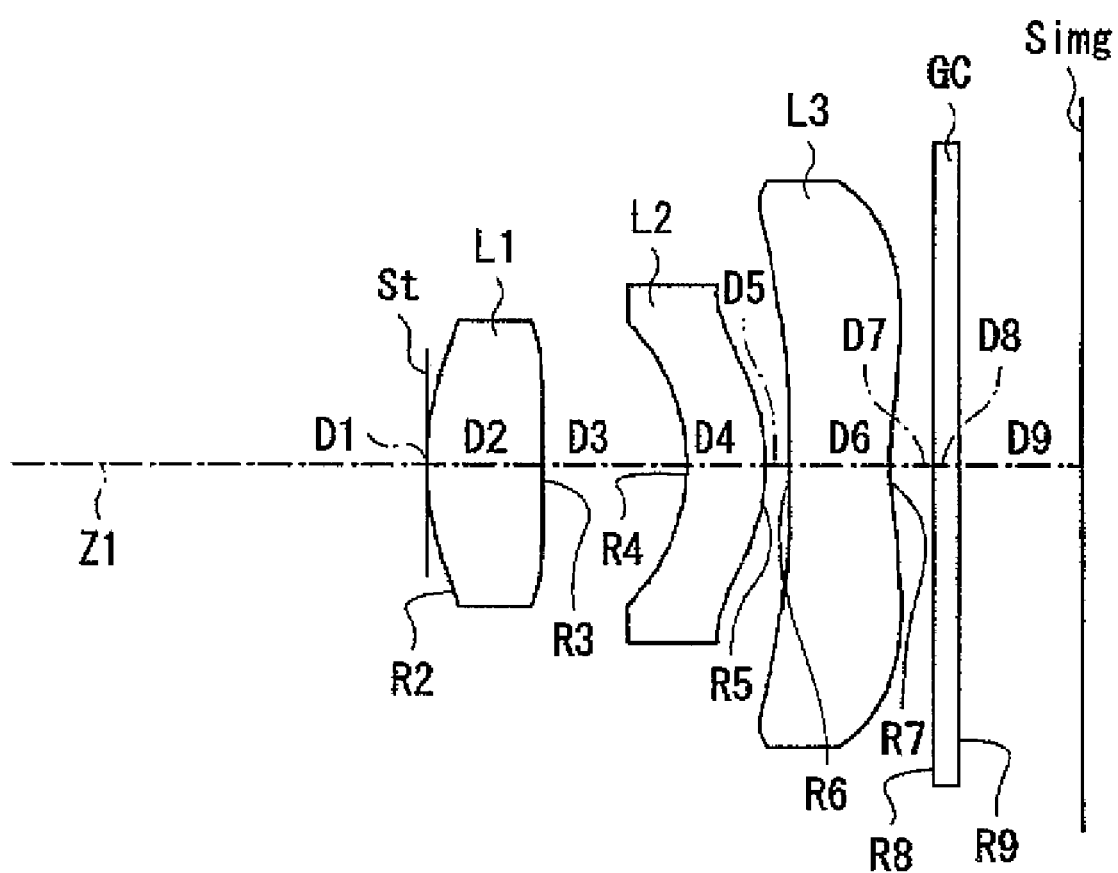
FIG. 13 is a lens cross-sectional profile corresponding to an imaging lens of a exemplary thirteenth example of the present invention.

FIG. 1 shows a first example configuration of an imaging lens of an exemplary embodiment of the present invention. The example configuration corresponds to lens configurations of a first numerical example (FIGS. 15A and 15B) to be described later. These examples correspond to second to thirteenth numerical examples (FIGS. 16A and 16B to FIGS. 27A and 27B) to be described later. In FIGS. 1 through 13, reference symbol Ri represents a radius of curvature of the $i^{th}$ surface on condition that, when a surface of a constituent element located closest to an object side is taken as the first surface, the constituent elements, including an aperture diaphragm St, are assigned reference numerals in such a way that the numerals sequentially increase toward an image side (an image formation side). Reference symbol Di denotes a surface spacing between the $i^{th}$ surface and the $i+1^{th}$ surface along an optical axis Z1. The respective example configurations are identical with each other in terms of a basic structure.

Figure 43A:
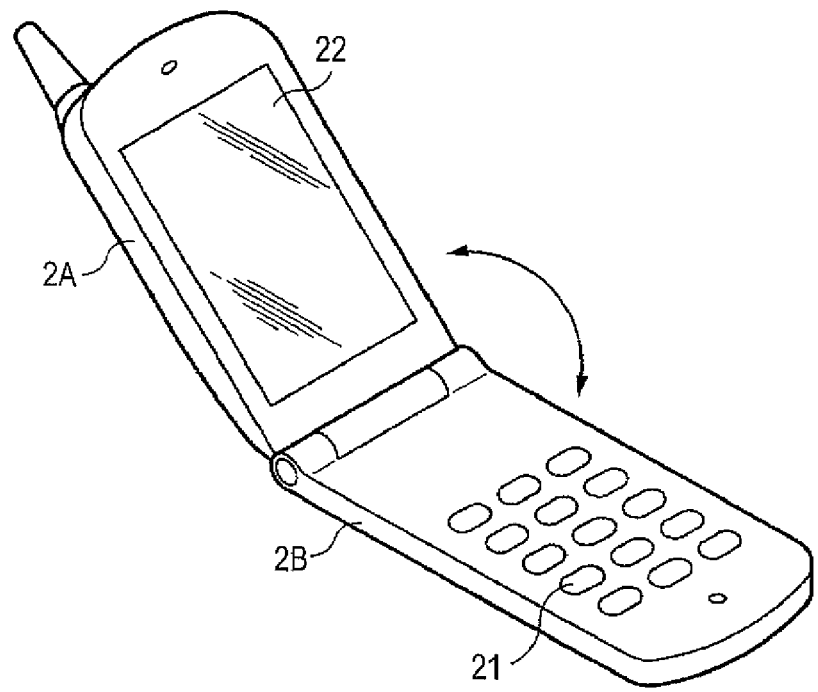
FIG. 43 is a perspective view showing an example configuration of a portable terminal device according to an exemplary embodiment of the present invention.
Figure 43B:
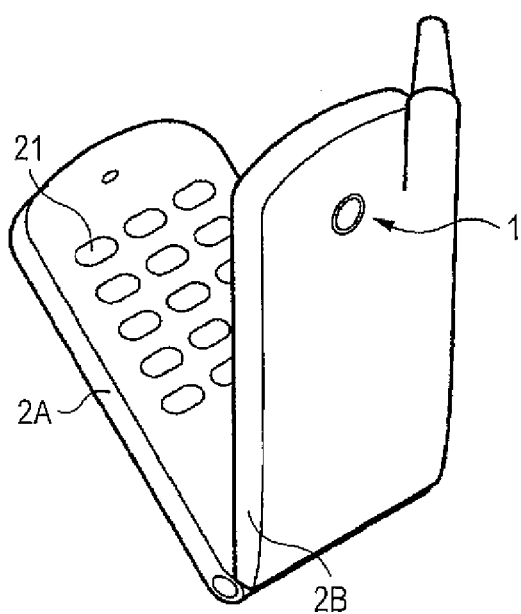

The imaging lens of the present embodiment is suitable for use with various imaging devices using an imaging element, such as a CCD, CMOS, and the like. In particular, the imaging lens is suitable for use with a comparatively-compact portable terminal device; for example, a digital still camera, a camera-equipped portable cellular phone, a PDA, and the like. FIGS. 43A and 43B show a camera-equipped portable cellular phone as an example of the portable terminal device. The camera-equipped portable cellular phone has an upper housing 2A and a lower housing 2B, and the upper and lower housings 2A and 2B are configured so as to be pivotable in the direction of an arrow shown in FIG. 43A. The lower housing 21 has operation keys 21. The upper housing 2A has a camera section (FIG. 43B) and a display section 22 (FIG. 43A). The display section 22 is built from an LCD (liquid-crystal panel), an EL (Electro-Luminescence) panel and the like. The display section 22 is situated on the side where it serves as an interior surface when the portable cellular phone is collapsed. The display section 22 can display an image, and the like, captured by a camera section 1 as well as various menu displays pertaining to phone functions. The camera section 1 is provided on the back side of the upper housing 2A. However, a location where the camera section 1 is provided is not limited to the back side. The camera section 1 has a camera module into which the imaging lens of the present embodiment is incorporated.

Figure 44:
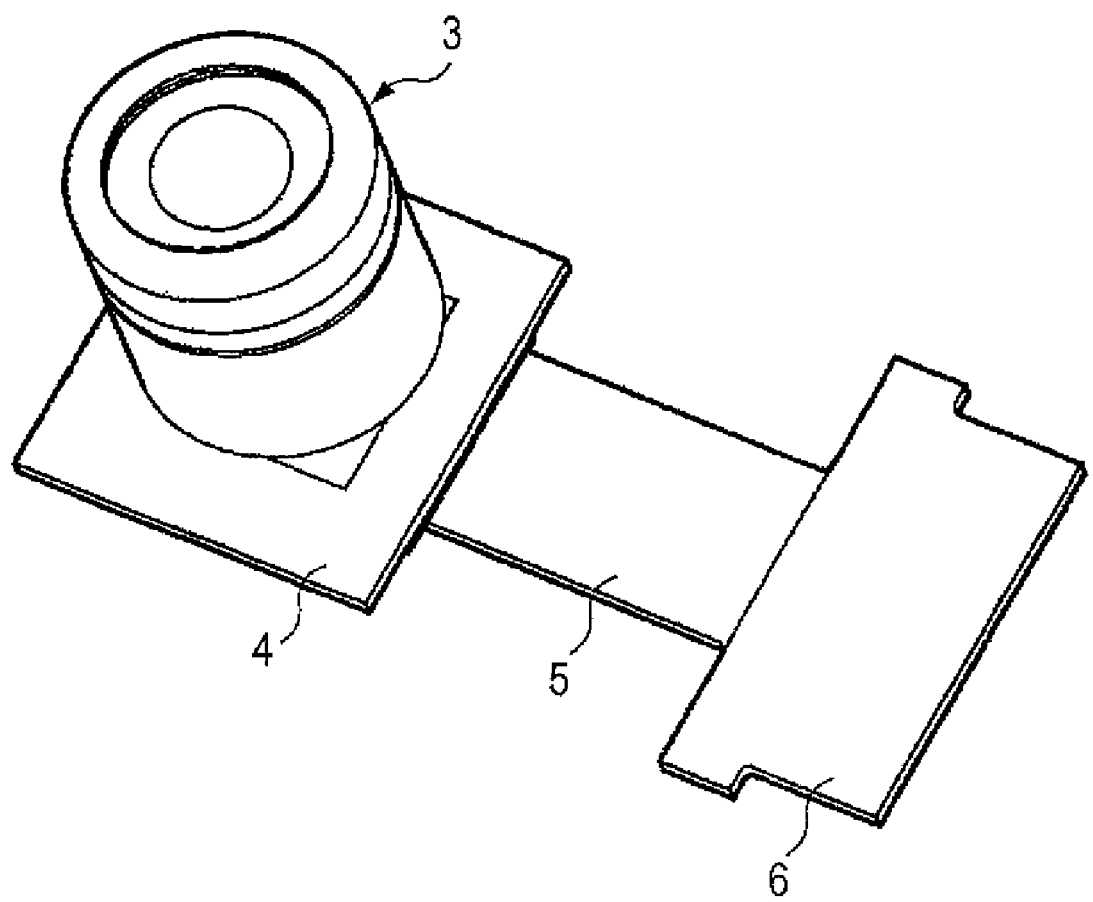
FIG. 44 is a perspective view showing an example configuration of a camera module according to an exemplary embodiment of the present invention.

FIG. 44 shows an example configuration of the camera module used in the camera section 1. The camera module has a lens barrel 3 housing an imaging lens of the embodiment, a support substrate 4 for supporting the lens barrel 3, and an imaging element provided at a position corresponding to an image formation surface of the imaging lens on the support substrate 4. The camera module has a flexible substrate 5 electrically connected to the imaging element on the support substrate 4; and an external connection terminal 6 which is electrically connected to the flexible substrate 5 and which can be connected to a signal processing circuit of a terminal device main body in the camera-equipped portable cellular phone, and the like. These constituent elements are formed integrally.

In the camera module, an optical image formed by the imaging lens is converted into an electrical image pickup signal by means of the imaging element, and the image pickup signal is output to the signal processing circuit of the terminal device main body by way of the flexible substrate 5 and the external connection terminal 6. The camera module uses the imaging lens of the present embodiment, whereby a high-resolution image pickup signal is obtained. The terminal device main body can generate a high-resolution image from the image pickup signal.

As shown in FIGS. 1 through 13, the imaging lens of the present embodiment has a first lens L1, a second lens L2, and a third lens L3 in order from the object side along the optical axis Z1. It is desirable that the optical aperture diaphragm St should be located as closely to the object side as possible in order to ensure telecentricity. In any of the example configurations, the aperture diaphragm St is located at the front of the first lens L1; that is, the position closest to the object side in the lens system. An imaging element, such as a CCD, is placed on an image formation surface Simg of the imaging lens. Various optical members are placed between the third lens L3 and the imaging element in accordance with the configuration of a camera to which the lens is to be attached.

For instance, a flat glass plate GC, such as cover glass for protecting an imaging surface or an infrared-cut filter, is placed.

In order to correct various aberrations while an attempt is made to miniaturize the imaging lens by use of a smaller number of lenses, both surfaces of each of the first lens L1, the second lens L2, and the third lens L3 are preferably aspherical. In this case, a plastic lens has the advantage in machining the aspherical lens, and hence appropriate adoption of a plastic lens is preferable.

The first lens L1 has positive refractive power in the vicinity of the optical axis. The object-side surface of the first lens L1 becomes convex toward the object side in the vicinity of the optical axis. In the first, second, fourth, fifth, sixth, seventh, and eighth example configurations (FIG. 1. FIG. 2, FIG. 4, FIG. 5, FIG. 6, FIG. 7, and FIG. 8), an image-side surface of the first lens L1 is concave toward the image side in the vicinity of the optical axis. In the third, tenth, eleventh, twelfth, and thirteenth example configurations (FIG. 3, FIG. 10, FIG. 11, FIG. 12, and FIG. 13), the image-side surface of the first lens L1 becomes planar toward the image side in the vicinity of the optical axis, thereby assuming the structure of a planoconvex lens in the vicinity of the optical axis. In the ninth example configuration (FIG. 9), the image-side surface of the first lens L1 becomes convex toward file image side in the vicinity of the optical axis, thereby assuming the structure of a biconvex lens in the vicinity of the optical axis. An Abbe number vd1 preferably assumes a relationship of vd1>50.

Moreover, the image-side surface of the first lens L1 preferably assumes such an aspherical shape that the shape of the image-side surface changes toward the object side with increasing proximity to the periphery than does in the vicinity of the optical axis. For instance, the image-side surface preferably assumes a concave shape or a shape close to a plane in the vicinity of the optical axis, assuming such an aspherical shape as to become convex with increasing proximity to the periphery.

The second lens L2 has positive or negative refractive power in the vicinity of the optical axis. The object-side surface of the second lens L2 assumes a concave shape toward the object side in the vicinity of the optical axis, and the image-side surface of the lens L2 assumes a convex shape toward the image side in the vicinity of the optical axis. Namely, the second lens L2 has a structure of a meniscus lens with its concave surface directed toward the object side in the vicinity of the optical axis.

When the second lens L2 is imparted with an aspherical shape, the object-side surface of the second lens is preferably formed into; for example, such an aspherical shape that the shape changes toward the object side with increasing proximity toward the periphery than does in the vicinity of the optical axis. A preferred shape is that a concave shape is achieved in the vicinity of the optical axis and that an absolute value of radius of curvature becomes smaller at the periphery than in the vicinity of the optical axis (i.e., a more sharp concave surface is achieved at the periphery).

The third lens L3 has positive or negative refractive power in the vicinity of the optical axis. The object-side surface of the third lens L3 becomes convex or concave toward the object side in the vicinity of the optical axis. The image-side surface becomes concave toward the image side in the vicinity of the optical axis. The image-side surface of the third lens 13 assumes; for example, a concave shape, toward the image side in the vicinity of the optical axis, thereby assuming the structure of a positive meniscus lens in the vicinity of the optical axis.

An Abbe number vd3 of the third lens L3 preferably assumes a relationship of vd3 >50.

The third lens LB is a lens located at a position closest to the image formation surface. Therefore, the third lens L3 separates a luminous flux at each angle of view when compared with the first lens L1 and the second lens L2. Therefore, easy compensation of an aberration induced at each angle of view and easy compensation of a field curvature and distortion are achieved by means of an appropriate use of an aspherical surface in the third lens L3. Further, telecentricity is readily assured. Therefore, it is desirable that the shape of the third lens L3 located in the vicinity of the optical axis should be changed from the shape of the same acquired at the periphery thereof. Specifically, the object-side surface of the third lens L3 preferably assumes a concave shape in the vicinity of die optical axis and becomes close to a plane at any point along the way to the periphery or assumes a convex shape in the vicinity of the optical axis and a concave shape at any point along the way to the periphery.

Preferably, the image-side surface of the third lens L3 assumes such an aspherical shape as to change toward the image side up to any point along the way to the periphery than in the vicinity of the optical axis and to finally change toward the object side. For example, the image-side surface preferably assumes such an aspherical shape as to become concave in the vicinity of the optical axis, to have a concave shape whose absolute radius of curvature is large up to any point, and to become convex with increasing proximity to the periphery.

The imaging lens of the present embodiment preferably satisfies at least one of the following conditional expressions provided below, $f/f3<0.95$ (1), more preferably, $f/f3<0.7$ (1)'.

$BR2<0.1$ (2-0), preferably $BR2<0$ (2), more preferably $BR2<-0.2$ (2-1), furthermore preferably $BR2<-0.32$ (2-2), $0.22<(D3+D4)/f<0.43$ (3), preferably $0.25<(D3+D4)/f<0.40$ (3)'.

$vd2>40$ and $-1.2<f3/f<0.0$ (4).

f3/f in Equation (4) preferably satisfies $-1.0<f3/f<0.0$ (4)'.

$vd2>40$ and $0.0<f2/f<2.0$ (5).

$D4/f<0.136$ (6).

$vd2>40$ and $(D4+D6)/f<0.31$ (7).

$D6/f \leq 0.155$ (8).

$0.0<f2/f<1.0$ (9).

$f3/f<-0.4$ and $-5.6<f2/f<-3.3$ (10).

f2/f in Equation (10) preferably satisfies $$-5.6 < f2/f < -3.7 \quad (10)'$$

$$f3/f < -0.4 \text{ and } 0.5 < f2/f \quad (10A)$$

$$f3/f < -166 \text{ and } 0.1 < |f1/f2| < 0.5 \quad (11)$$

f1/f2 in Equation (9) preferably satisfies $$0.1 < f1/f2 < 0.5 \quad (11)'$$

or $$-0.1 < f1/f2 < -0.1 \quad (11)''$$

$$-0.85 < f2/\{f3 \cdot (45 - vd2)\} < -0.13 \quad (12)$$

$$f/R6 < -0.4 \quad (13)$$

$$-1.2 < f3/f < 0.0 \quad (14)$$

$$-2.5 < f/f3 < 0.0 \text{ and } 0.5 < f2/f \quad (15)$$

In the above conditional expressions, f: a focal length of the entire system
f1: a focal length of the first lens L1
f2: a focal length of the second lens L2
f3: a focal length of the third lens L3
D3: surface spacing between a rear surface (an image-side surface) of the first lens and a front surface (an object-side surface) of the second lens along the optical axis
D4: center thickness of the second lens L2
D6: center thickness of the third lens L3
R6: a paraxial radius of curvature of an object-side surface of the third lens L3
vd2: an Abbe number of the second lens L2

Figure 14A:
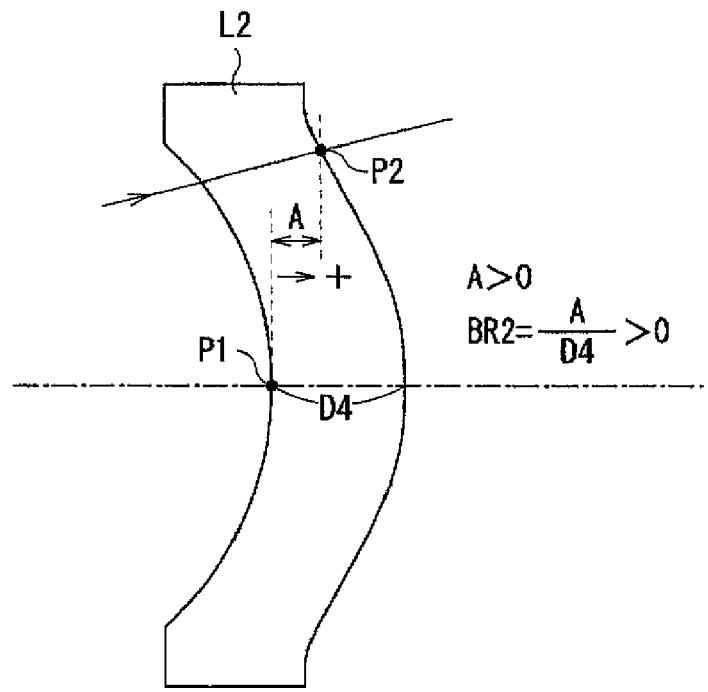
FIG. 14 is a descriptive view of a conditional expression.
Figure 14B:
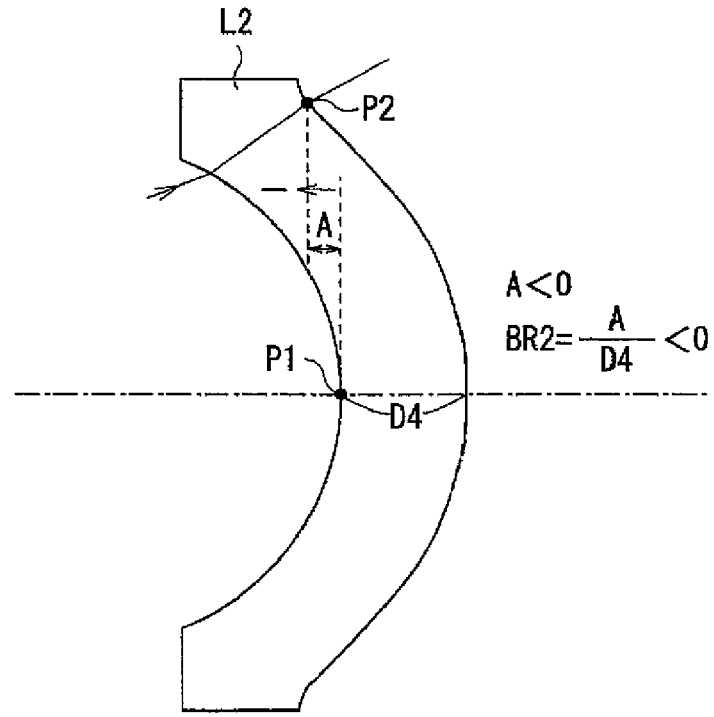

In the conditional expression (2-0), (2), (2-1), and (2-2) BR2 is set to BR2=A/D4, provided that a distance from an optic-axial vertex position P1 on the front surface of the second lens to a position P2 on the rear surface of the second lens through which a light ray passes toward a corner of an image height is taken as A and that the center thickness of die second lens L2 is taken as D4. The traveling direction of the light ray (i.e., a direction from the object side toward the image side) is taken as a positive direction. FIGS. 14A and 14B show the concept of the BR2. Since D4 corresponds to the center thickness of the second lens L2, D4 assumes a value which is greater than 0. Therefore, in the case of A>0, BR2>0 is achieved. As shown in FIG. 14A, acquisition of A>0 means that the rear surface of the second lens is situated at a position of the periphery closer to the image side than to the optic-axial vertex position P1 on the front surface. In the case of A<0, BR2<0 is acquired. As shown in FIG. 14B, acquisition of A<0 means that, when the traveling direction of the light ray is taken as a positive direction, the rear surface of the second lens is situated at a position of the periphery closer to the object side than to the optic-axial vertex position P1 on the front surface.

In the present embodiment, exemplary configuration examples taking into account the respective conditional expressions will be described. For instance, the configuration examples are broadly divided into six preferred conceivable categories. FIG. 29 shows a relationship between the configuration groups and the conditional expressions and the correspondence between the configuration groups and examples to be described later.

<First Configuration Group>
(Basic Configuration 1-1)
The aperture diaphragm St, the first lens L1, the second lens L2, and the third lens L3 are arranged in sequence from the object side. The first lens L1 is built from a positive lens whose convex surface is directed toward the object side. The second lens L2 is built from a meniscus lens whose concave surface is directed toward the object side. Further, the conditional expressions (1) and (2) are satisfied.

The following exemplary configurations may also be built on the basic configuration 1-1.

(Configuration 1-2)
A configuration satisfying the conditional expression (3) as well as the basic configuration 1-1

(Configuration 1-3)
A configuration satisfying the conditional expression (4) as well as the basic configuration 1-1 or the configuration 1-2

(Configuration 1-4)
A configuration satisfying the conditional expression (5) as well as the basic configuration 1-1

The configurations 1-1 to 1-4 may also satisfy the conditional expression (2-1) or the conditional expression (2-2).

<Second Configuration Group>
(Basic Configuration 2-1)
The aperture diaphragm St, the first lens L1, the second lens L2, and the third lens L3 are arranged in sequence from the object side. The first lens L1 is built from a positive lens whose convex surface is directed toward the object side. The second lens L2 is built from a lens whose concave surface is directed toward the object side. Further, the conditional expressions (1) and (6) are satisfied.

The following exemplary configurations may also be built on the basic configuration 2-1.

(Configuration 2-2)
A configuration satisfying the conditional expression (3)) as well as the basic configuration 2-1

(Configuration 2-3)
A configuration satisfying the conditional expression (7) as well as the configuration 2-2

(Configuration 2-4)
A configuration satisfying the conditional expression (8) as well as the configuration 2-2 or the configuration 2-3

(Configuration 2-5)
A configuration satisfying the conditional expression (10) as well as the configuration 2-1

(Configuration 2-6)
A configuration satisfying the conditional expression (4) as well as the configuration 2-1

(Configuration 2-7)
A configuration satisfying the conditional expression (11) as well as the configuration 2-1

(Configuration 2-8)
A configuration satisfying the conditional expression of f1/f2 as well as the configuration 2-1

The configurations 2-1 to 2-4 may also satisfy the conditional expression (4) or the conditional expression (5). Alternatively, the configurations 2-1 to 2-4 may also satisfy the conditional expression (3)', the conditional expression (4)' or the conditional expression (9).

<Third Configuration Group>
(Basic Configuration 3-1)
The aperture diaphragm St, the first lens L1, the second lens L2, and the third lens L3 are arranged in sequence from the object side. The first lens L1 is built from a positive lens whose convex surface is directed toward the object side. The second lens L2 is built from a lens whose concave surface is directed toward the object side and which has negative refractive power. Further, the conditional expressions (3) and (10) are satisfied.

<Fourth Configuration Group>
(Basic Configuration 4-1)

The aperture diaphragm St, the first lens L1, the second lens L2, and the third lens L3 are arranged in sequence from the object side. The first lens L1 is built from a positive lens whose convex surface is directed toward the object side. The second lens L2 is built from a lens whose concave surface is directed toward the object side. The third lens L3 has negative refractive power. Further, the conditional expressions (3) and (11) are satisfied.

Alternatively, a configuration may be built from the basic configuration 4-1, satisfying the conditional expression (11)' or the conditional expression (11)".

<Fifth Configuration Group>
(Basic Configuration 5-1)

The aperture diaphragm St, the first lens L1 having positive refractive power, the second lens L2 having positive refractive power, and the third lens L3 having negative refractive power are arranged in sequence from the object side. An object-side surface of the third lens L3 assumes a concave shape in the vicinity of the optical axis, and an image-side surface of the lens L3 assumes a convex shape in at the periphery. Further, the conditional expressions (3) and (13) is satisfied.

The following exemplary configurations may also be built on the basic configuration 5-1.

(Configuration 5-2)

A configuration satisfying the conditional expression (14) as well as the basic configuration 5-1

(Configuration 5-3)

A configuration satisfying the conditional expression (9) as well as the basic configuration 5-1.

(Configuration 5-4)

A configuration satisfying the conditional expressions (4) and (9) as well as the basic configuration 5-1

The operation and effect of the imaging lens configured as mentioned above will now be described.

The imaging lens includes, as a whole, a small number of lenses; namely, three lenses, and an appropriate combination is adopted in connection with the shape of the lens and the distribution of power. Thus, the configurations of the respective lenses are entirely optimized, whereby the imaging lens is miniaturized and sophisticated.

In the imaging lens, the aperture diaphragm St is located at the front of the first lens L1, whereby a lens system having an advantage in shortening the entire length of the lens system and ensuring telecentricity is obtained. The imaging lens can compensate for aberrations more effectively by means of optimizing aspherical surfaces of the respective surfaces. In order to address an imaging element having a larger number of pixels, telecentricity; namely, a property for rendering an angle of incidence of a principal ray to an imaging element closely parallel to an optical axis (i.e., the angle of incidence to an imaging surface close to a value of zero with respect to the normal to the imaging surface), is sought. In the imaging lens, for example, the image-side surface of the third lens L3 that is a final lens surface closest to the imaging element is imparted with a shape which becomes concave toward the image side in the vicinity of the optical axis and which becomes convex toward the image side at the periphery, whereby an aberration induced at each angle of view is appropriately compensated for. Thus, the angle of incidence of the luminous flux on the imaging element is controlled so as to become a given angle or less. Thereby, inconsistencies in the amount of light acquired over the entire image forming surface can be lessened, and the imaging lens becomes advantageous in compensation for the curvature of field and distortion.

Operation and effects of the respective conditional expressions are as follows:

The conditional expression (1) specifies appropriate power of the third lens L3. The power of the third lens L3 is optimized by means of satisfaction of the conditional expression (1), and the lens becomes advantageous principally in compensation for the curvature of field and a chromatic aberration.

The conditional expression (2-0), (2), (2-1), and (2-2) are relevant to the shape of the second lens. When the value of BR2 is close to zero, a position P2 at the periphery of the rear surface of the second lens L2 becomes close to the optic-axial vertex position P1 on the front surface. As shown in FIG. 14A, when BR2 is positive, the position P2 at the periphery of the rear surface of the second lens L2 is situated at a position closer to the image side than to the optic-axial vertex position P1 on the front surface. As shown in FIG. 14B, when BR2 is negative, the position P2 at the periphery of the rear surface of the second lens L2 is situated at a position closer to the object side than to the optic-axial vertex position P1 on the front surface. As BR2 comes close to zero and a negative value becomes greater, an angle of exit of the light ray can be made obtuse. The second lens becomes advantageous primarily in compensation for the curvature of field and distortion.

The conditional expression (3) specifies an appropriate relationship between a distance from the first lens L1 to the second lens L2 and the center thickness of the second lens L2. An increase in the entire length of the lens system is prevented by satisfying the conditional expression (3); the angle of exit of the light ray becomes easy to maintain appropriately; and the lens system becomes advantageous in compensation for the curvature of field, too. When the upper limit of the conditional expression (3) is surpassed, the angle of exit of the light ray cannot be maintained appropriately. More preferably, the numerical range is caused to fall within the range of the conditional expression (3)', so that much superior optical performance is attained.

The conditional expression (4) specifies appropriate power of the third lens L3 when the Abbe number of the second lens L2 assumes a relationship of vd2>40. In the conditional expression (4), when f3/f exceeds the upper limit the third lens becomes disadvantageous primarily in compensation for a longitudinal chromatic aberration and an astigmatic difference. When f3/f becomes smaller than the lower limit, the third lens becomes disadvantageous primarily in compensation for the curvature of field, distortion and a chromatic aberration of magnification. More preferably, the numerical range of f3/f is caused to fall within the range of the conditional expression (4)', much superior optical performance is achieved.

The conditional expression (5) specifies appropriate power of the second lens L2 when the Abbe number of the second lens L2 assumes a relationship of vd2>40. A chromatic aberration of magnification arising in the second lens L2 and, by extension, the curvature of field and distortion can be maintained well by satisfaction of the conditional expression (5). When f2/f exceeds or becomes smaller than the upper or lower limit of the conditional expression (5), the second tens becomes disadvantageous primarily in compensation for the curvature of field and distortion.

The conditional expression (6) specifies an appropriate center thickness for the second lens L2. The center thickness of the second lens L2 becomes comparatively smaller by satisfaction of the conditional expression (6), and appropriate maintenance of the angle of exit of the light ray and maintenance of superior resolution performance become easy to perform. Moreover, the lens becomes advantageous in shortening of the entire length of the lens system while variations in sensitivity due to manufacture are suppressed.

The conditional expression (7) specifies an appropriate thickness for the second lens L2 and an appropriate thickness for the third lens L3 when the Abbe number of the second lens L2 assumes a relationship of vd2>40. Resolution performance and the curvature of field can be maintained appropriately by satisfaction of the conditional expression (7), and the lens becomes advantageous in shortening of the entire length of the lens system while variations in sensitivity due to manufacture are suppressed.

The conditional expression (8) specifies an appropriate center thickness for the third lens L3. The center thickness of the third lens L3 is made smaller so as to satisfy the conditional expression (8), whereby resolution performance and the angle of exit of the light ray are maintained appropriately. The lens becomes advantageous in shortening of the entire length of the lens system while variations in sensitivity due to manufacture are suppressed. The entire length of the lens system can be shortened by satisfaction of the conditional expression (8). Moreover, material cost can be kept low.

The conditional expression (9) specifies appropriate power of the second lens L2. Power of the second lens L2 is optimized by satisfaction of the conditional expression (9), and the second lens becomes advantageous primarily in compensation for the curvature of field and distortion. However, the power exceeds the upper limit or becomes smaller than the lower limit, the lens becomes disadvantageous primarily in compensation for the curvature of field and distortion.

The conditional expression (10) specifies appropriate power of the second lens L2 and appropriate power for the third lens L3. As a result of satisfaction of the conditional expression (10), a power balance between the second lens L2 and the third lens L3 is optimized, whereby the lenses become advantageous in compensation for various aberrations.

In a state where f2/f<−0.4 is achieved, negative power of the third lens L3 becomes weak. A balance among the longitudinal chromatic aberration, an astigmatic difference, the curvature of field, and distortion becomes insufficient when compared with the case where negative power is strong. Under conditions where the negative power of the third lens L3 is weak, the negative power of the second lens L2 is caused to fall within the range of the conditional expression (10), whereby the balance among various aberrations can be maintained well. In connection with the conditional expression (10), when file range of negative power of the second lens L2 exceeds the upper limit or becomes smaller than the lower limit, the balance among the various aberrations cannot be maintained. More preferably, the numerical range is caused to fall within the range of the conditional expression (10)', whereby much superior optical performance is attained.

The conditional expression (10) corresponds to preferable conditions where the second lens L2 has negative power. However, when the conditional expression (10) has positive power, a conditional expression (10A) is satisfied, whereby superior optical performance is achieved.

The conditional expression (11) specifies appropriate power for the respective lenses. A power balance among the first lens L1, the second lens L2, and the third lens L3 is optimized by satisfaction of the conditional expression (11), and the lenses become advantageous in compensation for various aberrations.

In a state where f3/f<−1.66 is achieved, negative power of the third lens L3 becomes weak. A balance among the longitudinal chromatic aberration, an astigmatic difference, the curvature of field, and distortion becomes insufficient when compared with the case where negative power is strong. Under conditions where the negative power of the third lens L3 is weak, a value of |f1/f2| is appropriately specified, whereby the balance among various aberrations can be maintained well.

When the upper limit of 0.1<|f1/f2|<0.5 is exceeded, the power of the second lens L2 becomes excessively stronger than the positive power of the first lens L1, thereby posing difficulty in simultaneous compensation for a spherical aberration, the curvature of field, a coma aberration, and a chromatic aberration. When the range of power of the second lens becomes smaller than the lower limit, difficulty is encountered in compensating for the curvature of field and a coma aberrations so that superior optical performance is not achieved. More preferably, the numerical range is caused to fall within the range of the conditional expression (11)' or (11)", whereby superior optical performance is obtained.

The conditional expression (12) specifies an appropriate balance among the power (1/f2) of the second lens L2, the power (11/f3) of the third lens L3, and dispersion of the second lens L2; and contributes to lessening of a chromatic aberration of the entire lens system. When the range of power of the lens exceeds or becomes lower than the upper or lower limit of the conditional expression (12), a balance between the longitudinal chromatic aberration and the chromatic aberration of magnification is lost, and appropriate maintenance of the longitudinal chromatic aberration and the chromatic aberration of magnification cannot be performed simultaneously. A power balance between the second lens L2 and the third lens 3 is important in lessening the chromatic aberration of the entire lens system. At that time, when a material whose Abbe number is small is used for the second lens L2, it is desirable that the power of the second lens L2 should become weak. Conversely, when a material whose Abbe number vd2 is large is used for the second lens L2, it is desirable that the power of the second lens L) should become strong. The power of the second lens L2 and the power of the third lens L3 are appropriately controlled by satisfaction of the conditional expression (12) while a value of 45 is taken as a boundary condition for the Abbe number vd2.

The conditional expression (13) specifies an appropriate shape for the object-side surface of the third lens L3. The concave shape of the object-side surface of the third lens L3 is made comparatively sharp so as to satisfy the conditional expression (13). Thereby, the angle of exit of the light ray is maintained appropriately while the curvature of field and distortion are held appropriately, and assurance of telecentricity become easy.

The conditional expression (14) specifies appropriate power of the third lens L3. In the conditional expression (14), when f3/f exceeds the upper limit, the lens becomes disadvantageous primarily in compensation for the longitudinal chromatic aberration and the astigmatic difference. When f3/f becomes lower than the lower limit, the lens becomes disadvantageous primarily in compensation for the curvature of field, distortion, and die chromatic aberration of magnification.

The conditional expression (15) specifies appropriate power for the second lens L2 and the third lens L3. A power balance between the second lens L2 and the third lens L3 is optimized by means of satisfaction of the conditional expression (15), and the lenses become advantageous in compensation for various aberrations.

As mentioned above, according to the imaging lens of the present embodiment, die configurations of the respective lenses are optimized by use of the three lenses as a whole. Accordingly, a compact, high-performance imaging lens system—which addresses an increase in the number of pixels and whose aberrations are properly compensated for—can be obtained. More superior optical performance cm be achieved by satisfaction of preferable conditions, as required.

EXAMPLES

Specific numeral examples of the imaging lens of the present embodiment will now be described. First through thirteenth numeral examples will be collectively described hereunder.

FIGS. 15A and 15B show, as a first example, specific lens data corresponding to the configuration of the imaging lens shown in FIG. 1. In particular, FIG. 15A shows specific lens data pertaining to the imaging lens, and FIG. 15B shows aspherical data (i.e., data pertaining to an aspherical surface). In a field of a surface number Si of the lens data shown in FIG. 15A, numbers of $i^{th}$ (i=1 to 9) surfaces assigned numerals so as to sequentially increase with increasing proximity toward the image side. A field of the radius of curvature Ri shows a value (mm) of a radius of curvature of the $i^{th}$ surface from the object side in correspondence to reference symbol Ri provided in FIG. 1. A field of a surface spacing Di shows an axial space (mm) between the surface Si that is $i^{th}$ from the object side and a surface Si+1 that is i+1$^{th}$ from the object side. Ndj shows a value of a refractive index of the $j^{th}$ (j=1 to 4) optical element from the object side at the d-line (a wavelength of 587.6 nm). A vdj field shows a value of Abbe number of the $j^{th}$ optical element from the object side with respect to the d-line.

In the imaging lens of the first example, both surfaces of the respective first, second, and third lenses L1, L2, and L3 assume an aspheric shape. Basic lens data shown in FIG. 15A show numerals of curvature radii acquired in the vicinity of the optical axis as curvature radii of the aspherical surfaces. In numerals shown in FIG. 15B as aspherical surface data, symbol "E" shows that a numeral subsequent to E is a "power index" determined by taking a numeral of 10 as a base. A numeral represented by an exponential function which takes a numeral of 10 as a base is multiplied by a numeral preceding symbol "E." For instance, in the case of 1.0E-02 means 1.0× 10$^{-2}$.

Coefficients Bn and values of Ka in an equation of the shape of an aspherical surface expressed by Equation (A) provided below are shown as aspherical data. More specifically, the aspherical data show the length (mm) of a vertical line extending from a point on an aspherical surface situated at a position of a height Y from an optical axis Z1 to a tangential plane (a plane normal to the optical axis Z1) of a vertex of the aspherical surface. Respective aspherical surfaces of the imaging lenses of the first example are represented as aspherical coefficients $B_n$ by effective use of coefficients $B_4$, $B_6$, $B_8$, and $B_{10}$ of the even-numbered orders; that is, the fourth, sixth, eighth, and tenth orders.

$$Z = C \cdot Y^2 / \{1 + (1 - KA \cdot C^2 \cdot Y^2)^{1/2}\} + \Sigma B_n \cdot Y^n \quad (A)$$

(n=an integer of three or more)
Z: a depth of an aspherical surface (mm);
Y: a distance (height) from an optical axis to a lens surface (mm);
KA: a conic constant;
C: paraxial curvature=1/R;
(R: paraxial radius of curvature);
$B_n$: the $n^{th}$ aspheric coefficient As in the case of the imagine tens of the first example, specific lens data corresponding, to the configurations of the imaging lenses shown in FIGS. 2 through 13 are taken as second through thirteenth examples, and the data are shown in FIGS. 16A and 16B through FIGS. 27A and 27B. In any of the second through thirteenth examples, both surfaces of the respective first, second, and third lenses L1, L2, and L3 assume aspheric surfaces, as in the case of the first example. Respective aspherical surfaces of the imaging lenses of the ninth example are represented by effective use of coefficients $B_4$, $B_6$, $B_8$, and $B_{10}$ of the even-numbered orders; that is, the fourth, sixth, eighth, and tenth orders, as in the case of the first example. In the second through thirteenth examples exclusive of the ninth example, respective aspherical surfaces are expressed as aspherical coefficients $B_n$ by effective use of coefficients $B_3$ to $B_{10}$ of even-numbered and odd-numbered orders from the third to the tenth.

FIG. 28 collectively shows values pertaining to the previously-described respective conditional expressions with respect to the respective examples. Now, reference numeral EX represents examples. In FIG. 28, fields highlighted by hatching show that numerals of that example fall within the numerical range of the conditional expression.

FIG. 29 shows a relationship between the foregoing configuration groups and the conditional expressions and a correspondence among the examples.

Figure 30A:
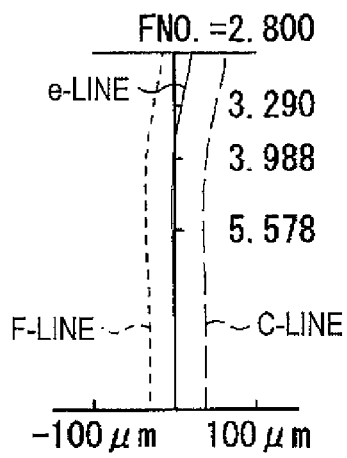
FIG. 30A shows a spherical aberration.
Figure 30B:
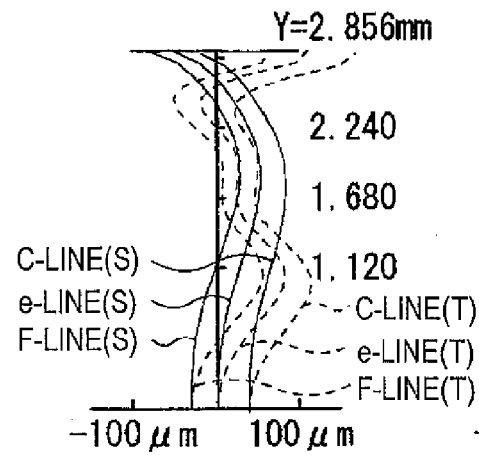
FIG. 30B shows an astigmatism.
Figure 30C:
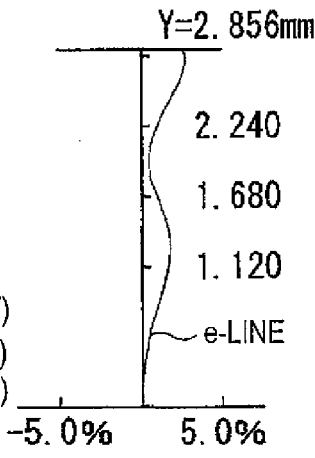
FIG. 30C shows a distortion.
Figure 31A:
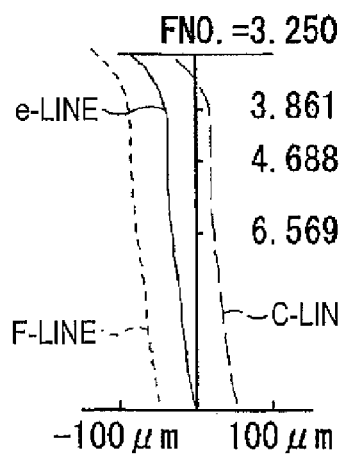
FIG. 31A shows a spherical aberration.
Figure 31B:
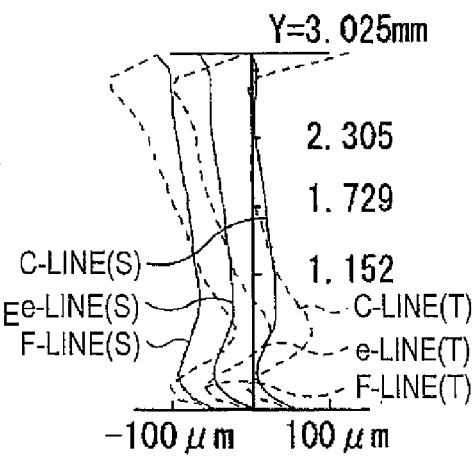
FIG. 31B shows an astigmatism.
Figure 31C:
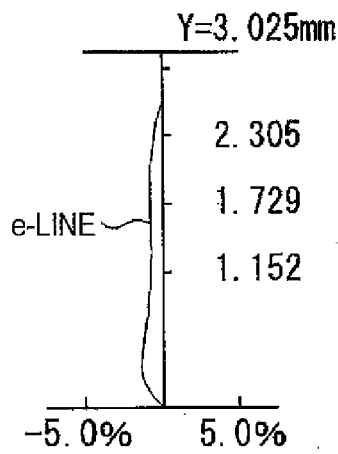
FIG. 31C shows a distortion.
Figure 32A:
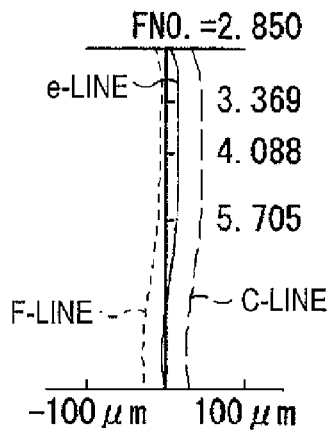
FIG. 32A shows a spherical aberration.
Figure 32B:
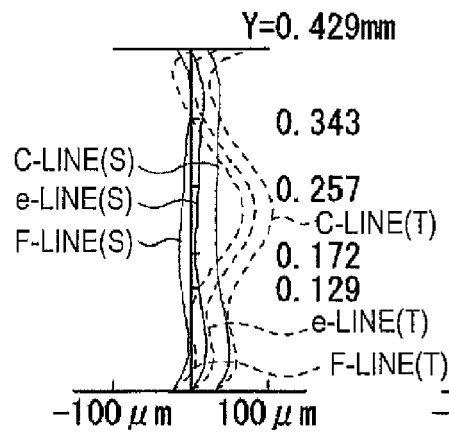
FIG. 32B shows an astigmatism.
Figure 32C:
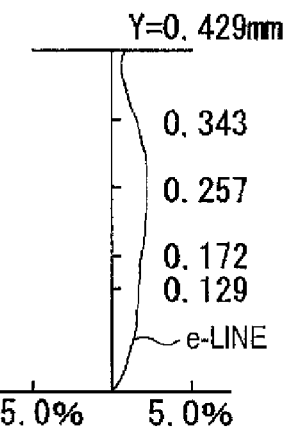
FIG. 32C shows a distortion.
Figure 33A:
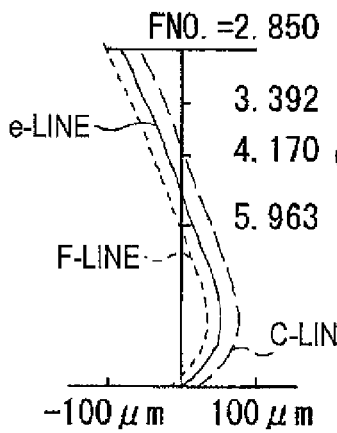
FIG. 33A shows a spherical aberration.
Figure 33B:
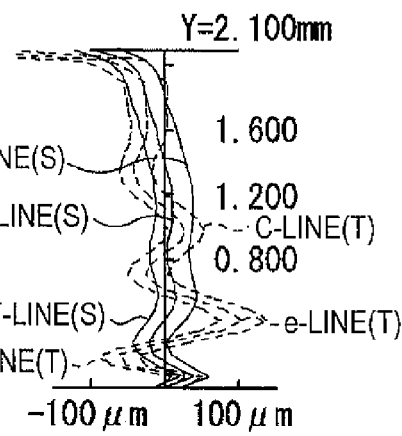
FIG. 33B shows an astigmatism.
Figure 33C:
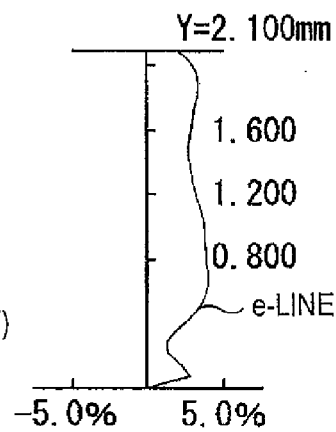
FIG. 33C shows a distortion.
Figure 34A:
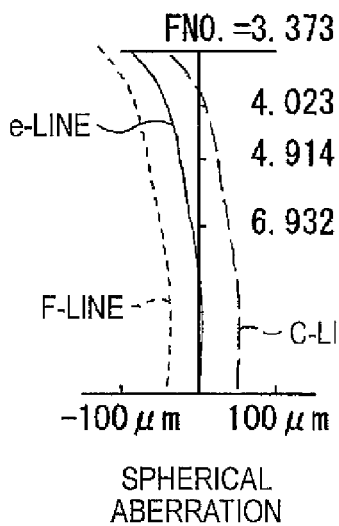
FIG. 34A shows a spherical aberration.
Figure 34B:
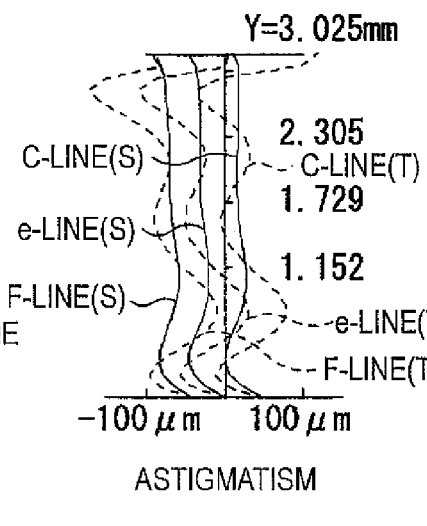
FIG. 34B shows an astigmatism.
Figure 34C:
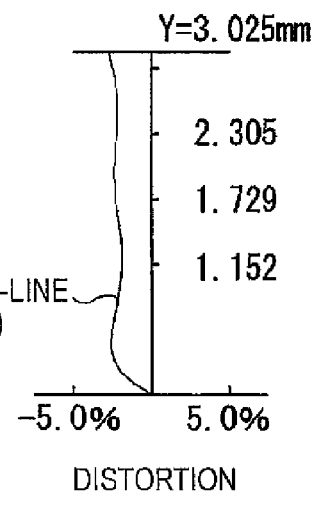
FIG. 34C shows a distortion.
Figure 35A:
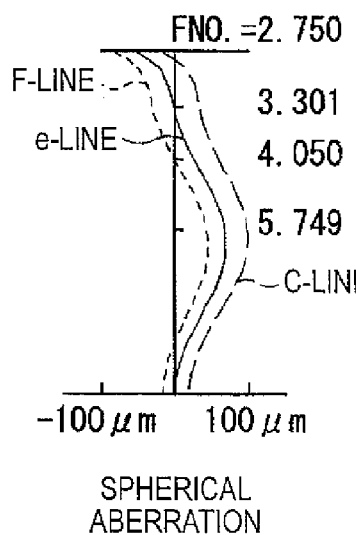
FIG. 35A shows a spherical aberration.
Figure 35B:
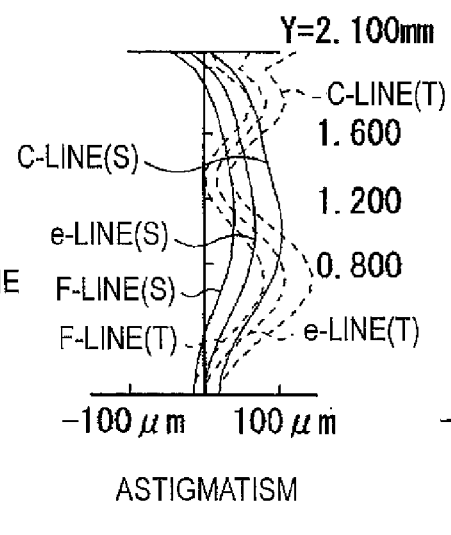
FIG. 35B shows an astigmatism.
Figure 35C:
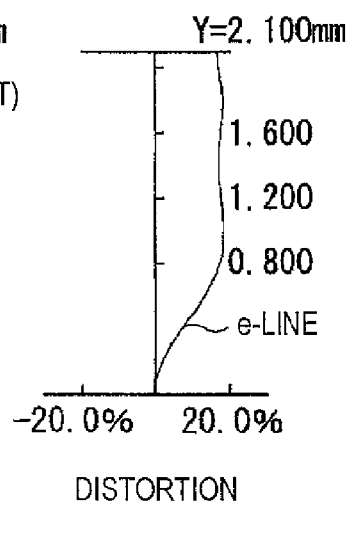
FIG. 35C shows a distortion.
Figure 36A:
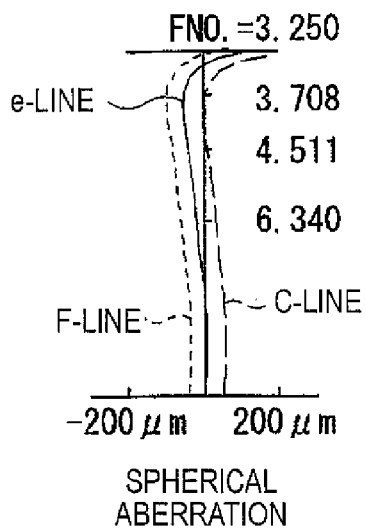
FIG. 36 is an aberration chart showing various aberrations of the imaging lens of the seventh examples wherein FIG.
FIG. 36C shows a distortion.
Figure 36B:
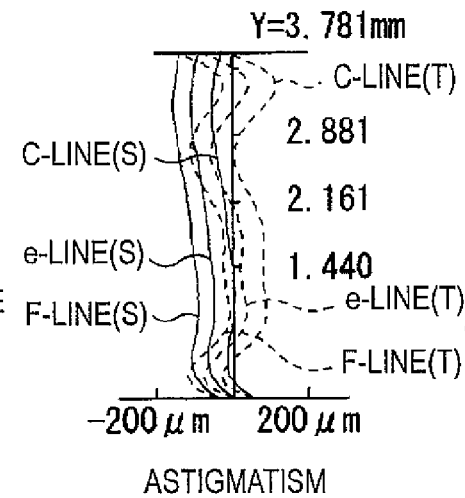
Figure 36C:
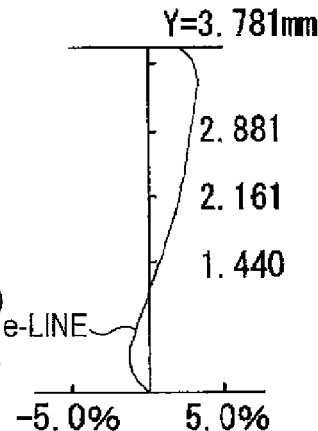
Figure 37A:
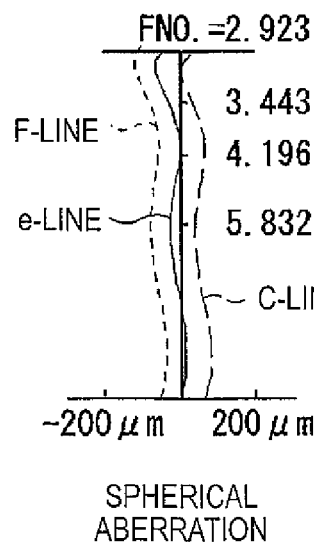
FIG. 37A shows a spherical aberration.
Figure 37B:
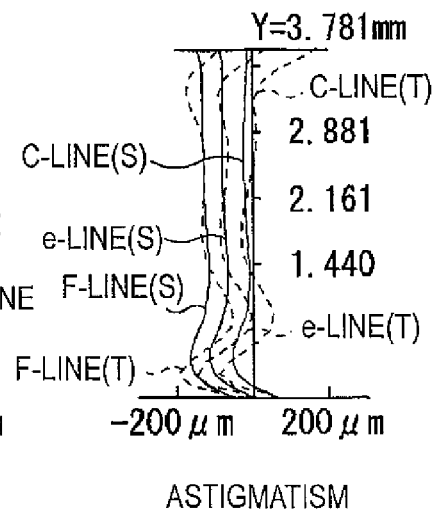
FIG. 37B shows an astigmatism.
Figure 37C:
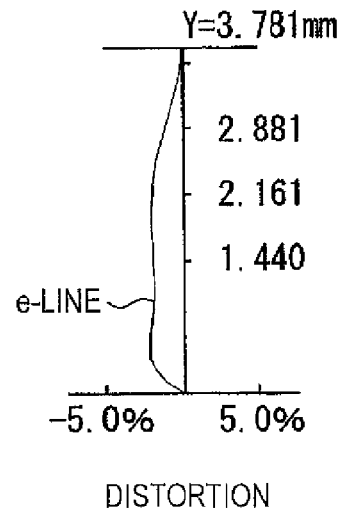
FIG. 37C shows a distortion.
Figure 38A:
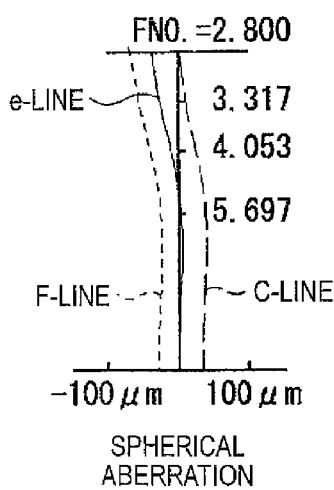
FIG. 38A shows a spherical aberration.
Figure 38B:
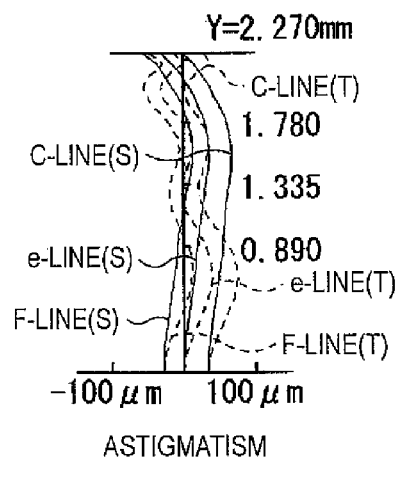
FIG. 38B shows an astigmatism.
Figure 38C:
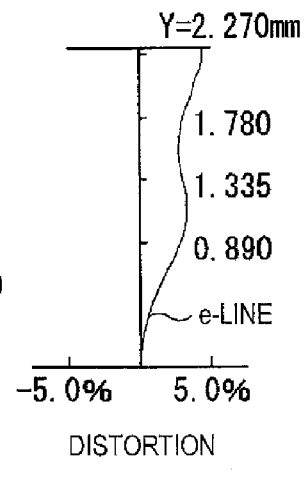
FIG. 38C shows a distortion.
Figure 39A:
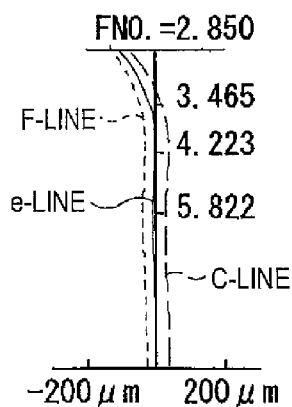
FIG. 39A shows a spherical aberration.
Figure 39B:
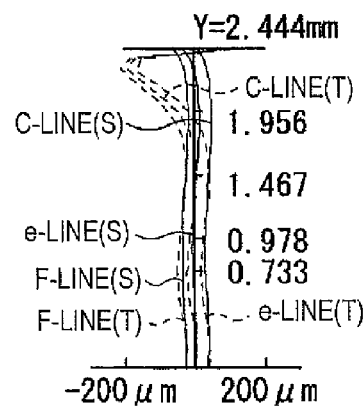
FIG. 39B shows an astigmatism.
Figure 39C:
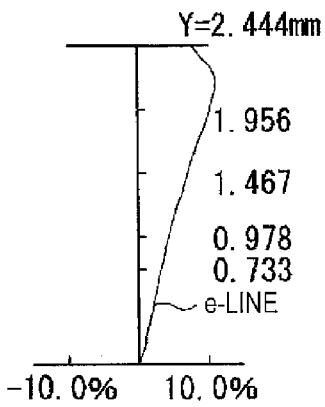
FIG. 39C shows a distortion.
Figure 40A:
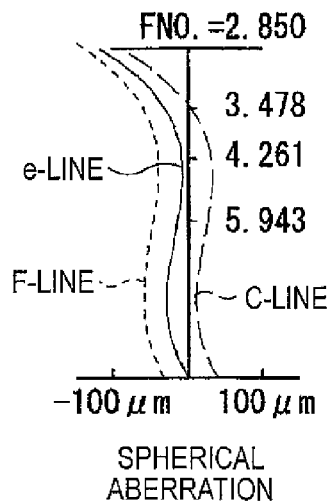
FIG. 40A shows a spherical aberration.
Figure 40B:
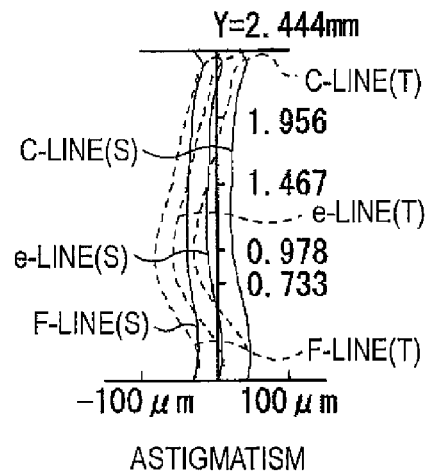
FIG. 40B shows an astigmatism.
Figure 40C:
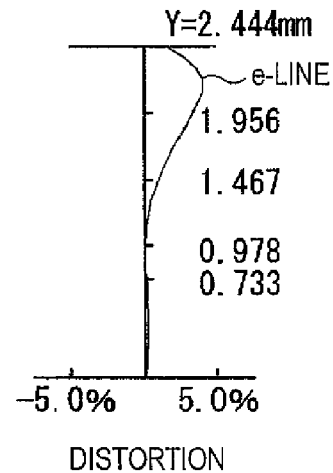
FIG. 40C shows a distortion.
Figure 41A:
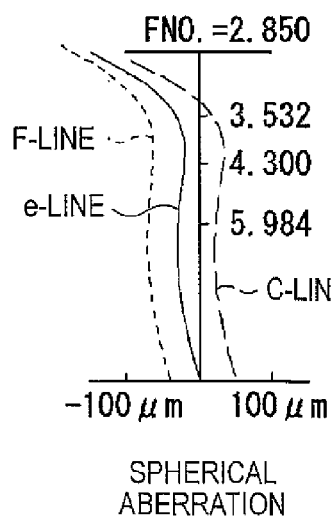
FIG. 41A shows a spherical aberration.
Figure 41B:
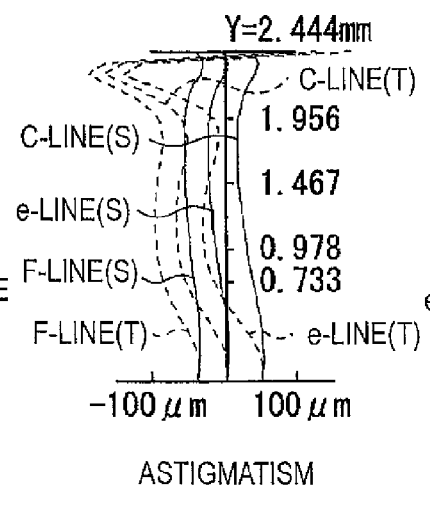
FIG. 41B shows an astigmatism.
Figure 41C:
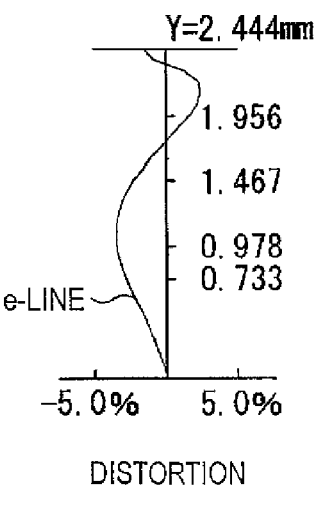
FIG. 41C shows a distortion.
Figure 42A:
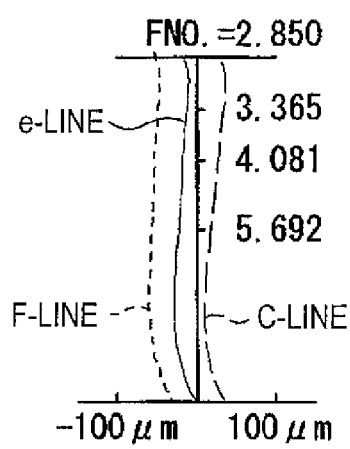
FIG. 42A shows a spherical aberration.
Figure 42B:
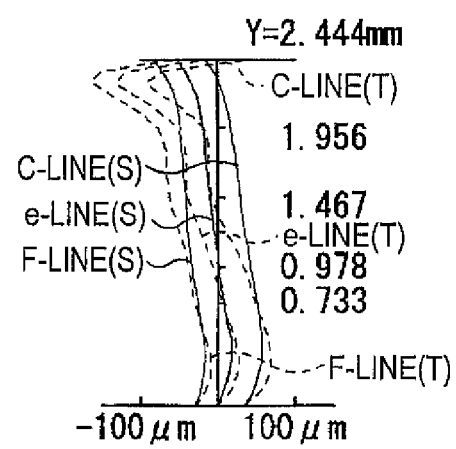
FIG. 42B shows an astigmatism.
Figure 42C:
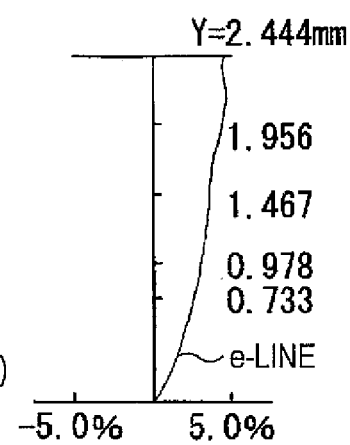
FIG. 42C shows a distortion.

FIGS. 30A to 30C show spherical aberrations, astigmatisms, and distortions of the imaging lens of the first example. In respective aberration charts, aberrations achieved when the e-line is taken as a reference waveform. A spherical aberration chart and an astigmatism chart show aberrations achieved with respect to the F-line (a wavelength of 486.13 nm) and C-line (a wavelength of 656.27 nm), too. In the astigmatism chart, a solid line represents an aberration achieved in a saggital direction (S), and a broken line represents an aberration achieved in a tangential direction (T). Reference symbol FNo, represents an F number, and Y represents an image height.

Likewise, aberrations of the imaging lenses of the second through thirteenth examples are shown in FIGS. 31A, 31B, 31C through FIGS. 42A, 42B, and 42C.

As is evident from the respective sets of numeral data and the respective aberration charts set forth, the configurations of the respective lenses are optimized by use of the three lenses as a whole. Accordingly, a compact, high-performance imaging lens system whose aberrations axe property compensated for can be obtained.

The present invention is not limited to the foregoing embodiment and examples but susceptible to various modifications. For instance, values of the curvature radii, surface spacings, and refractive indices of the respective lens components are not limited to the values described in connection with the respective numeral examples, and other numerals can also be assumed.

Although description has been given heretofore of the invention with reference to the above-mentioned embodiments and examples, the invention is not limited to such embodiments and examples but various modifications are also possible. For example, the values of the radii of curvature, surface intervals and refractive indexes of the respective lens components are not limited to the values that are shown in the above-mentioned numerical examples, but other values can also be used. Also, in the above-mentioned embodiments and examples, the both surfaces of the first to fourth lenses are all formed as aspherical surfaces; however, the invention is not limited to this.

This application claims foreign priority from Japanese Patent Application Nos. 2006-303104 and 2007-285913, filed Nov. 8, 2006 and Nov. 2, 2007, respectively, the entire disclosure of which is herein incorporated by reference.

What is claimed is:

1. An imaging lens of a three-lens configuration, comprising: in order from an object side
    an aperture diaphragm;
    a first lens of a positive lens having a convex surface on the object side;
    a second lens of a meniscus lens having a concave surface on the object side; and
    a third lens,
    the imaging lens satisfying conditional expressions:

$$f/f3<0.95 \quad (1)$$

$$BR2<0 \quad (2)$$

wherein
    BR2 satisfies BR2=A/D4, A represents a distance from a vertex position on a object-side surface of the second lens and on an optical axis to a position on a image-side surface of the second lens through which a light ray passes toward a corner of an image height, provided that a traveling direction of the light ray is taken as a positive direction, and D4 represents a center thickness of the second lens,
    f represents a focal length of the imaging lens, and
    f3 represents a focal length of the third lens.

2. The imaging lens according to claim 1, further satisfying a conditional expression:

$$0.22<(D3+D4)/f<0.43 \quad (3)$$

wherein D3 represents a surface spacing between an image-side surface of the first lens and an object-side surface of the second lens along the optical axis.

3. The imaging lens according to claim 2, further satisfying a conditional expression:

$$vd2>40 \text{ and } -1.2<f3/f<0.0 \quad (4)$$

wherein vd2 represents an Abbe number of the second lens at the d-line.

4. The imaging lens according to claim 1, further satisfying a conditional expression:

$$vd2>40 \text{ and } -1.2<f3/f<0.0 \quad (4)$$

wherein vd2 represents an Abbe number of the second lens at the d-line.

5. The imaging lens according to claim 1, further satisfying a conditional expression:

$$vd2>40 \text{ and } 0.0<f2/f<2.0 \quad (5)$$

wherein vd2 represents an Abbe number of the second lens at the d-line; and f2 represents a focal length of the second lens.

6. The imaging lens according to claim 1, wherein the third lens is negative.

7. An imaging lens comprising: in order from an object side
    an aperture diaphragm;
    a first lens of a positive lens having a convex surface on the object side;
    a second lens of a meniscus lens having a concave surface on the object side; and
    a third lens,
    the imaging lens satisfying conditional expressions:

$$f/f3<0.95 \quad (1)$$

$$D4/f<0.136 \quad (6)$$

$$D6/f \leq 0.155 \quad (8)$$

wherein D4 represents a center thickness of the second lens; f represents a focal length of the imaging lens; D6 represents a center thickness of the third lens; and f3 represents a focal length of the third lens.

8. The imaging lens according to claim 7, further satisfying a conditional expression:

$$-0.5<f1/f2<-0.1$$

wherein f2 represents a focal length of the second lens.

9. The imaging lens according to claim 7, further satisfying a conditional expression:

$$0.22<(D3+D4)/f<0.43 \quad (3)$$

wherein D3 represents a surface spacing between an image-side surface of the first lens and an object-side surface of the second lens along an optical axis.

10. The imaging lens according to claim 7, wherein the third lens is negative.

11. An imaging lens comprising: in order from an object side
    an aperture diaphragm;
    a first lens of a positive lens having a convex surface on the object side;
    a second lens of a meniscus lens having a concave surface on the object side; and
    a third lens,
    the imaging lens satisfying conditional expressions:

$$f/f3<0.95 \quad (1)$$

$$D4/f<0.136 \quad (6)$$

wherein D4 represents a center thickness of the second lens; f represents a focal length of the imaging lens; and f3 represents a focal length of the third lens,
    further satisfying a conditional expression:

$$f3/f<-0.4 \text{ and } -5.6<f2/f<-3.3 \quad (10)$$

wherein f2 represents a focal length of the second lens.

12. An imaging lens comprising: in order from an object side
    an aperture diaphragm;
    a first lens of a positive lens having a convex surface on the object side;
    a second lens of a meniscus lens having a concave surface on the object side; and
    a third lens,
    the imaging lens satisfying conditional expressions:

$$f/f3<0.95 \quad (1)$$

$$D4/f<0.136 \quad (6)$$

wherein D4 represents a center thickness of the second lens; f represents a focal length of the imaging lens; and f3 represents a focal length of the third lens, further satisfying a conditional expression:

$$vd2>40 \text{ and } -1.2<f3/f<0.0 \quad (4)$$

wherein vd2 represents an Abbe number of the second lens at the d-line.

13. An imaging lens comprising: in order from an object side
    an aperture diaphragm;
    a first lens of a positive lens having a convex surface on the object side;
    a second lens of a meniscus lens having a concave surface on the object side; and
    a third lens, the imaging lens satisfying conditional expressions:

$$f/f3<0.95 \quad (1)$$

$$D4/f<0.136 \quad (6)$$

wherein D4 represents a center thickness of the second lens; f represents a focal length of the imaging lens; and f3 represents a focal length of the third lens, further satisfying a conditional expression:

$$f3/f<-1.66 \text{ and } 0.1<|f1/f2|<0.5 \quad (11)$$

wherein f2 represents a focal length of the second lens.

14. An imaging lens comprising: in order from an object side
   an aperture diaphragm;
   a first lens of a positive lens having a convex surface on the object side;
   a second lens of a meniscus lens having a concave surface on the object side; and
   a third lens,
   the imaging lens satisfying conditional expressions:

$$f/f3<0.95 \quad (1)$$

$$D4/f<0.136 \quad (6)$$

wherein D4 represents a center thickness of the second lens; f represents a focal length of the imaging lens; and f3 represents a focal length of the third lens,
   further satisfying a conditional expression:

$$022<(D3+D4)/f<0.43 \quad (3)$$

wherein D3 represents a surface spacing between an image-side surface of the first lens and an object-side surface of the second lens along an optical axis, and further satisfying a conditional expression:

$$vd2>40 \text{ and } (D4+D6)/f<0.31 \quad (7)$$

wherein vd2 represents an Abbe number of the second lens at the d-line; and D6 represents a center thickness of the third lens.

15. The imaging lens according to claim 14, further satisfying a conditional expression:

$$D6/f \leqq 0.155 \quad (8).$$

* * * * *